United States Patent [19]
Cohn et al.

[11] Patent Number: 5,740,231
[45] Date of Patent: Apr. 14, 1998

[54] NETWORK-BASED MULTIMEDIA COMMUNICATIONS AND DIRECTORY SYSTEM AND METHOD OF OPERATION

[75] Inventors: Robert S. Cohn, Saratoga, Calif.; Gregory M. Vaudreuil; Carl F. Schoeneberger, both of Dallas, Tex.; David M. Reece, Arlington, Tex.; Carlton C. O'Neal, Dallas, Tex.; Carl W. Kalbfleisch, Richardson, Tex.; Mark B. Whipple, Dallas, Tex.; James R. Swoopes, Plano, Tex.; Alan T. Huch; Michael P. Dimitroff, both of Dallas, Tex.

[73] Assignee: Octel Communications Corporation, Milpitas, Calif.

[21] Appl. No.: 307,517

[22] Filed: Sep. 16, 1994

[51] Int. Cl.$^6$ .................. H04M 1/64; H04M 3/50
[52] U.S. Cl. .................. 379/89; 379/93.01; 379/201; 379/207; 379/219; 370/401; 370/407; 370/408; 370/425; 395/200
[58] Field of Search .................. 379/68, 88, 89, 379/93, 94, 100, 201, 207, 219, 220; 370/85.13, 95.1, 95.2, 95.3, 60, 60.1, 61, 110.1, 67; 395/200, 200.1, 200.5

[56] References Cited

U.S. PATENT DOCUMENTS

| 4,661,974 | 4/1987 | Bales et al. | 379/198 |
|---|---|---|---|
| 4,734,931 | 3/1988 | Bourg et al. | 379/93 |
| 4,790,003 | 12/1988 | Kepley et al. | 379/88 |
| 4,797,672 | 1/1989 | Kousa | 340/825 |
| 4,807,274 | 2/1989 | Kousa | 379/6 |
| 4,837,798 | 6/1989 | Cohen et al. | 379/88 |
| 4,879,743 | 11/1989 | Burke et al. | 479/142 |
| 4,932,042 | 6/1990 | Baral et al. | 379/67 |
| 4,939,771 | 7/1990 | Brown et al. | 379/211 |
| 4,996,704 | 2/1991 | Brunson | 379/67 |
| 4,996,707 | 2/1991 | O'Malley et al. | 379/100 |

(List continued on next page.)

FOREIGN PATENT DOCUMENTS 9424803  10/1994  WIPO.

OTHER PUBLICATIONS

"Message Transport & Routing Service (MTRS), Technical Service & Architecture Description Special Report, (SR-INS-002662 Issue 1)", MTRS Industry Forum, Bellcore, Jul. 1, 1993.

(List continued on next page.)

Primary Examiner—Fan S. Tsang
Attorney, Agent, or Firm—Baker & Botts, L.L.P.

[57] ABSTRACT

A communications system (10) is provided which comprises a plurality of network hubs (12), (14), and (16). Network hubs (12), (14), and (16) are interconnected through a communications network (18). The system (10) interconnects messaging systems (24), (26), (28), (30), (32), (34), (36), (40), (42) and (44) having disparate capabilities and using disparate communications protocols. The network hubs use numbers of connection processors (52) and (54) to interact with the messaging systems. A hub database (68) and message store (58) are used to store control information and messaging information within the network hubs. A network processor (60) is used to interact with other hubs within the communications system (10). A message router (72), connection manager (74), data replicator (76), and an administrative event manager (78) are used to control the operations of the hub in processing a message. A management server (64) and a event processor (70) are used by communications system (10) to manage the internal operations of each of the network hubs. The network center (37) contains a customer computer interface system (167) and an interactive voice response system (169) to allow user interaction with information provider databases (39), a customer service system (161), a message tracking system (163), a billing system (159), and a HelpLine system (157). The network center (37) contains a master database (151) that is used to synchronize the databases stored in each of the network hubs (12), (14), and (16).

56 Claims, 9 Drawing Sheets

U.S. PATENT DOCUMENTS

| | | | |
|---|---|---|---|
| 5,113,430 | 5/1992 | Richardson, Jr. et al. | 379/67 |
| 5,131,020 | 7/1992 | Liebesny et al. | 379/59 |
| 5,187,735 | 2/1993 | Herrero Garcia et al. | 379/88 |
| 5,193,110 | 3/1993 | Jones et al. | 397/94 |
| 5,331,634 | 7/1994 | Fischer | 370/85.13 |
| 5,333,266 | 7/1994 | Boaz et al. | 379/89 |
| 5,339,356 | 8/1994 | Ishii | 379/234 |
| 5,363,369 | 11/1994 | Hemmady et al. | 370/60 |
| 5,406,557 | 4/1995 | Baudoin | 370/61 |
| 5,459,717 | 10/1995 | Mullan et al. | 379/220 |
| 5,493,564 | 2/1996 | Mullan | 370/58.2 |

OTHER PUBLICATIONS

"Message Transport & Routing Service (MTRS), Technical Service and Architecture Description Special Report, (SR–INS–002662 Issue 1)", *MTRS Technical Service and Architecture Description*, Bellcore, May 1993.

"Message Transport and Routing Service (MTRS), Voice Messaging and Beyond", by Angela Liu, Bellcore.

Hunse, Tom Sheridan, "Voice Mail Service Bureaus—Not Just Mailboxes Anymore", *Voice Processing Magazine*, Mar. 1993, pp. 30–34.

Company Profile of Voice Technologies Group, including a description of voice messaging products.

Various Articles and Documents relating to Envoy Global, Inc. and their voice messaging product, the Apogee 2000 (marked as Exhibits A–N).

Boudette, Neal "IBM Plans 'Smart' Messaging Service", *PC Week*, vol. 10, No. 50, Dec. 20, 1993, pp. 1, 16–17.

Smalley, Eric, et al., "AT&T to unveil On–Line Service Feating Intelligent Agents", *PC Week*, vol. 10, No. 49, Dec. 13, 1993, p. 1, 10–11.

"AT&T Bodylink Services Announces Support for Microsoft At Work Architecture and Software for Personal Communicators", *Business Wire*, Jun. 9, 1993, pp. 3–4.

Wexler, Joanie, "AT&T Builds Multimedia Mailboxes", *Network World*, Jan. 17, 1994, pp. 19, 21.

Flynn, Laurie, "Apple Adds New Front in Fierce On–Line War", *San Jose Mercury News*, Business Monday, Jan. 8, 1994, pp. 1E, 4E.

Johnson, Bradley, "(Th)e World According to Apple, On–line Interactive Service Lures Rivals, to Absorb AppleLink", *Advertising Age*.

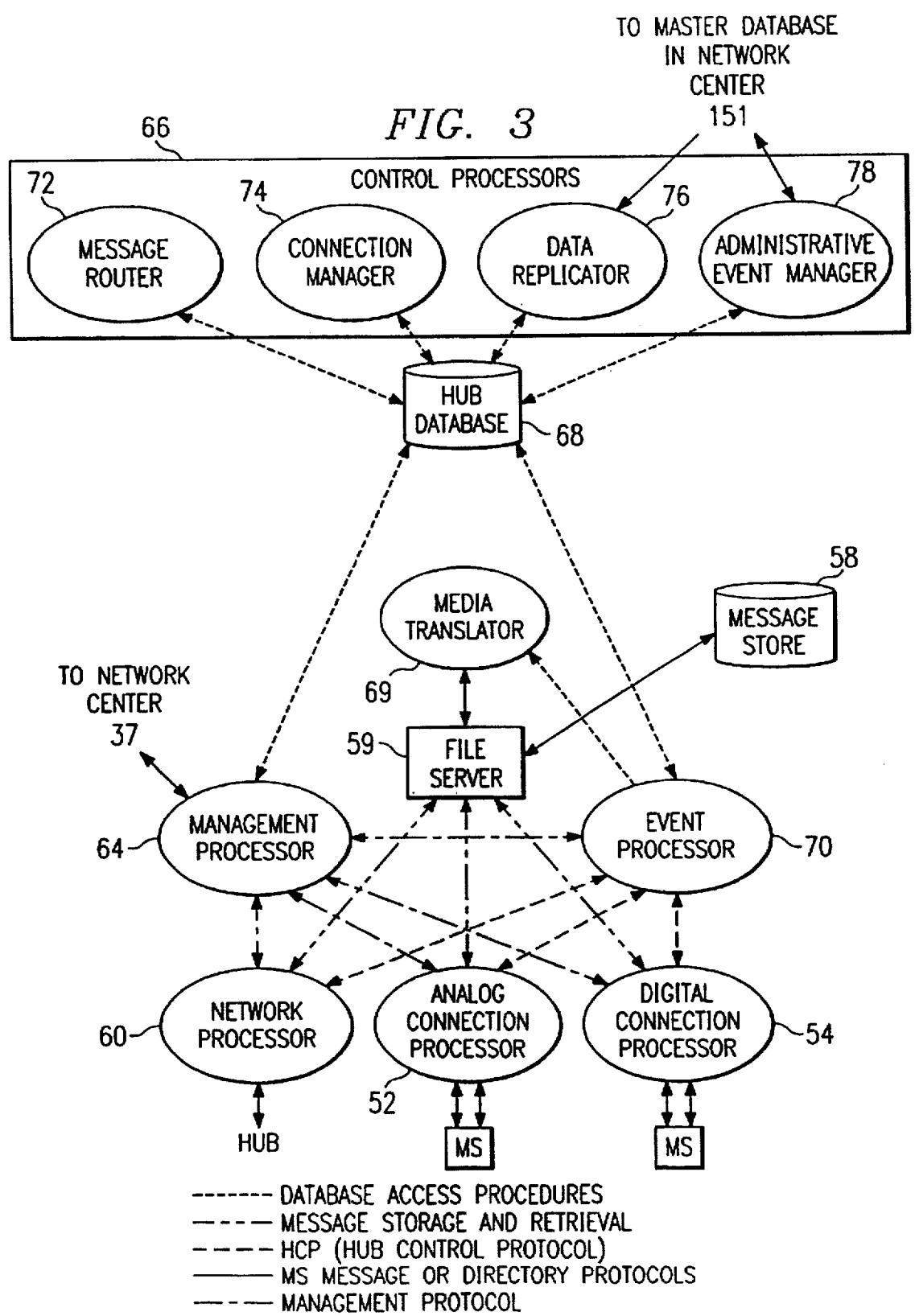

NETWORK CENTER

FIG. 14

DESTINATION ADDRESS ⇒ 214-555-2722
MESSAGE MEDIA ⇒ VOICE
SOURCE ADDRESS ⇒ 4437
SOURCE MESSAGING SYSTEM ⇒ CASJ01

⇓

INBOUND NETWORK HUB TABLE

|  | ARNIE | ARNIE | GREG |
|---|---|---|---|
| ADDRESS | 4437 | 408-555-4437 | 214-555-2722 |
| MS | CASJ01 | CASJ01 | TXDL03 |
| USER ID | 3 | 3 | 1 |
| COMMUNITY | 0 | 0 | 0 |
| MEDIA | VOICE | VOICE | VOICE, FAX |
| SCOPE | LOCAL | GLOBAL | LOCAL, GLOBAL |
| FEATURES | ALL | ALL | ALL |
| SUBJECT MATTER | ALL | ALL | ALL |

⇓

SOURCE USER ID ⇒ 3
COMMUNITY ⇒ 0
DESTINATION USER ID ⇒ 1
DESTINATION MESSAGING SYSTEM ⇒ TXDL03

⇓

OUTBOUND NETWORK HUB TABLE

|  | ARNIE | ARNIE | GREG |
|---|---|---|---|
| ADDRESS | 4437 | 408-555-4437 | 214-555-2722 |
| MS | CASJ01 | CASJ01 | TXDL03 |
| USER ID | 3 | 3 | 1 |
| COMMUNITY | 0 | 0 | 0 |
| MEDIA | VOICE | VOICE | VOICE, FAX |
| SCOPE | LOCAL | GLOBAL | LOCAL, GLOBAL |
| FEATURES | ALL | ALL | ALL |
| SUBJECT MATTER | ALL | ALL | ALL |

⇓

DESTINATION ADDRESS ⇒ 214-555-2722
SOURCE ADDRESS ⇒ 408-555-4437

NETWORK-BASED MULTIMEDIA COMMUNICATIONS AND DIRECTORY SYSTEM AND METHOD OF OPERATION

TECHNICAL FIELD OF THE INVENTION

This invention relates in general to the field of communications and information management systems and more particularly to an improved network-based voice messaging and multimedia communications and directory system and method of operation.

BACKGROUND OF THE INVENTION

Currently available communications facilities include voice communication, electronic mail communication, facsimile communication and video communication. These communications facilities are augmented by storage and retrieval facilities such as voice mail facilities, bulletin board services and the like. These various communications facilities have largely been operated on independent platforms, interconnected into private networks, and through independent and disparate channels of communication.

While local area network (LAN) based mail systems such as cc: Mail or large private electronic mail providers such as MCI Mail have facilitated some networking capability in electronic mail content, other communications facilities such as voice messaging and facsimile transmissions are largely localized facilities. For example, typical messaging systems are constrained within a single organization such as a company or at the broadest within a single local exchange carrier facility. In light of the largely local nature of messaging facilities and the incompatibility of proprietary messaging protocols, there has been little effort to supply large scale integrated network functionality to these communications services. In addition, most of these facilities are limited to a single media such only voice, only electronic mail, or only facsimile transmissions.

Additionally, in particular, voice messaging systems have not provided large scale integrated network functionality due to the following limitations:

1) Their terminal equipment is usually a telephone, which can only communicate with audio signaling such as Dual Tone Multi-Frequency (DTMF) signals.
2) The methods of addressing are frequently short, fixed length numerical addresses and currently deployed numbering schemes.
3) Messages are typically large, spanning several minutes of digitized analog audio signals.
4) Identity confirmation of the sender or recipient must be a spoken identification such as a mailbox number or a name.
5) Directory type functions such as lookup can not be done with ASCII type inputs but again are restricted to DTMF inputs.
6) Communications protocols associated with voice messaging systems do not provide the facilities necessary to request or specify special services such as media translation, subject matter identification and routing, and the like.

A further complication in the growth of existing messaging systems and networks is the parallel increase in the complexity of managing the directory and addressing information associated with the network. Existing directory facilities are usually limited to a single system or, at most, a single organization. It is difficult, if not impossible with current systems, to acquire and use effectively directory information from other facilities as the integrated system increases in complexity as other facilities are added to the network. These large scale directories are more complicated to deal with in voice messaging systems due to the fact that any functionality, such as retrieval or lookup, provided to the user is restricted to DTMF inputs.

The isolated nature of present messaging systems provides for little standardization that may be used to effect the communications between disparate systems that must occur for effective networking of systems. As such, even messaging systems that are working in the same media, for example, two voice messaging systems, may be incapable of transferring information and messages between the systems due to the differences in the protocols used by the systems to process and transfer messages.

The management of message traffic in a networked environment creates additional concerns. As a message passes out of the control of a local messaging system and into the network, the responsibility for routing and delivery of the message must also pass to the network. This responsibility creates a need for a network with significant message tracking and management capabilities. The complexity of this management task grows enormously as the size of the network increases. This complexity further increases with voice messaging systems due to the addressing being numerical, and limited in size most often to the sender/recipient's phone number or some other local private numbering plan, and to the size of the addressing fields in any of the local networking protocols.

Accordingly, a need has arisen for an integrated communications system which supplies network-based voice and multimedia communication facilities, and voice and multimedia directory services for communications including voice mail, electronic mail, facsimile transmissions, voice transmissions and video transmissions.

SUMMARY OF THE INVENTION

In accordance with the teachings of the present invention, a communications system is disclosed which substantially eliminates or reduces disadvantages associated with prior systems and solutions and provides new solutions never before available. In accordance with one embodiment of the present invention, a network-based voice and multimedia communications system is provided that comprises a plurality of network hubs operable to communicate with each other and with local messaging systems. The network hubs operate to receive messages in any media using any addressing convention from users either directly or through local messaging systems and to transmit the messages to other users whether located on local messaging systems or otherwise through the plurality of network hubs. This capability introduces a further complication for voice messaging systems that has yet to be encountered, in that voice messaging systems must be accessed and addressed utilizing standard DTMF signaling, numerical addressing and directory queries, and all within the native protocol of the user messaging system. According to one embodiment of the present invention, the network hubs are in constant communication with one another and constantly update a directory database which comprises user profiles for users of the communications system. The user profiles include identification confirmations associated with the users, such as a user's spoken name, as well as other user-specific information. The communications system is operable to transmit an identification confirmation for a given user when another user of the communications system attempts to send a message to that user. For large scale integrated network functionality, interfacing with voice messaging systems introduces a further complication for user profiles including identification confirmation in that large distributed network directories must be built and maintained based upon numerical addressing and accessed utilizing DTMF signaling and the native protocols of the user messaging system.

According to a further embodiment of the present invention, the network hubs are operable to maintain and store user profiles that include user preferences associated with each user. The communications system of the present invention is operable to perform media translations such that messages received in one media can be translated into another media based upon the preference of the destination user as stored in the user's profile information. For large scale integrated network functionality, interfacing with voice messaging systems introduces a further complication for media preference translation in that large distributed network directories must be built and maintained, based upon numerical addressing, that are accessed utilizing DTMF signaling and the native protocols of the user system.

According to a further embodiment of the present invention, the communications system supports mailing list distribution of messages. According to this embodiment of the present invention, the communications system receives a message which is addressed to a configurable mailing list comprising a plurality of destination addresses associated with users of the communications system. A mailing list agent may act as the sender of the message to distribute the message to each of the addresses in the mailing list. For large scale integrated network functionality, interfacing with voice messaging systems introduces a further complication for mailing list distribution, in that large distributed network directories must be built and maintained. These directories must be accessed and addressed utilizing standard DTMF signaling, numerical addressing and directory queries using the native protocol of the user system.

According to one embodiment of the present invention, the network hubs maintain constant communication paths to one another such that the current state of the entire system is always available to each of the network hubs. In this manner, the location and status of each message within the communications system can be tracked and altered at any time after the message is created and before the message is delivered. For large scale integrated network functionality, interfacing with voice messaging systems introduces a further complication for accessing and update of user profile information, in that large distributed network directories must be built and accessed by the numerical addresses of the users of the messaging system.

According to a further embodiment of the present invention, access is provided into the communications system for nonsubscribers of the communications system. In this manner, nonsubscribers can place messages or other communications directly onto the communications system for delivery. Further, facilities are also provided to deliver messages to nonsubscribers by the placement of conventional telephone calls, facsimile transmissions or E-mail transmissions to addresses which are provided by the message sender. A further complication to the communications system for providing nonsubscribers the capability to deposit and retrieve messages with voice messaging systems requires that the communications system support standard telephone interfaces, support numerical addressing, support only voice as the entry and exit media, supply identification confirmation in a spoken form such as the spoken name or spoken address, and provide directory services via DTMF signaling.

According to a further embodiment of the present invention, the network hubs may be used to distribute mass mailings of message traffic to selected users of the communications system. According to this embodiment, the user profiles associated with each user may contain information to allow each user to specify what types of information and from whom that user would like to receive and in what media and location the user would like to receive the information. For large scale integrated network functionality, interfacing with voice messaging systems introduces a further complication for distribution of mass mailings in that large distributed network directories must be built and accessed by the numerical addresses of the users of the communications system. According to one embodiment of the present invention, advertising and other commercial special interest information can be routed through the communications system for fees charged to the providers of the information. Users of the network are billed for ordinary messages router through the network or for information services and may be given credit for each advertising message actually received to provide an incentive for users to receive the advertising message traffic. For large scale integrated network functionality, interfacing with voice messaging systems introduces a further complication for providing advertising and other commercial special interest information messaging services in that large distributed network directories must be built and maintained, based upon numerical addressing and that the messages are delivered utilizing DTMF signaling and the native protocols of the user's messaging system.

According to a further embodiment of the present invention, the communications system is operable to deliver compound messages that comprise information in more than one media. For example, a single message may comprise both a voice message and a facsimile transmission. The communications system of the present invention is operable to route each portion of the message to an appropriate receiving facility associated with the destination user. For example, if a compound message is sent that comprises both a voice message and a facsimile message, the communications system of the present invention can deliver both messages together or split the two messages and deliver the voice message to a voice mailbox associated with the intended recipient and deliver the facsimile message to a fax destination associated with the intended recipient. The communications system of the present invention is also operable to translate messages received in one media to a media associated with the facilities of the destination user if the destination user does not have or does not desire delivery in certain media. For example, if a compound message is sent that comprises a voice message and an electronic mail transmission but the destination user only has a voice mailbox and a fax machine, the communications system of the present invention will translate the electronic mail message to a facsimile image and transmit the voice portion of the compound message to the voice mailbox and the translated portion to the fax destination. For large scale integrated network functionality, interfacing with voice messaging systems introduces a further complication for the processing of multimedia messages and the split routing that has yet to be developed, in that large distributed network directories must be built containing the numerical addresses for the different media destinations and accessed by the numerical addresses of the users of the communications system, and delivered utilizing DTMF signaling and the native protocols of the user system. Current technology and implementations of message addressing using short, fixed length numerical addresses are inadequate when trying to implement global addressing. The communications system of the present invention must supply additional information and mechanisms to its addressing schemes to create globally unique addressing from such short, fixed length numerical addresses.

According to a further embodiment of the present invention, the communications system is operable to translate messages between different languages to accommodate foreign-speaking users. If the message is not already a text message, the communications system of the present invention will use its media translating capability to place a message in a textual format such that an automated language translation of the text message can take place. The language-translated message can then be translated into the appropriate media for the destination user. For large scale integrated network functionality, interfacing with voice messaging systems introduces further complications for providing language translation, in that large distributed network directories must be built and maintained containing language preference information which must be accessed based upon numerical addressing and that the messages are delivered utilizing DTMF signaling and the native protocols of the user system.

According to a further embodiment of the present invention, the communications system is operable to coordinate password based, public and private key or other forms of messaging security to allow for secure transmission and receipt of messages through the communications system. For large scale integrated network functionality, interfacing with voice messaging systems introduces further complications for providing security features, in that large distributed network directories must be built and maintained containing the security access keys and methods which must be accessed based upon numerical addressing and that the messages and security keys are delivered utilizing DTMF signaling and the native protocols of the user system.

According to a further embodiment of the present invention, the communications system is operable to receive an address or other information associated with an intended recipient and to access user profile information associated with the intended recipient and retrieve addressing information associated with the intended recipient. As such, a sender of a message can use whatever information is known about an intended recipient of a message to identify the recipient and the communications system of the present invention will access and use the required addressing information appropriate for the identified recipient and the message being sent. For large scale integrated network functionality, interfacing with voice messaging systems introduces further complications for providing custom address translation, in that large distributed network directories must be built and maintained containing numerical address translation information which must be accessed based upon numerical addressing and that the messages are delivered utilizing DTMF signaling and the native protocols of the user system.

According to a further embodiment of the present invention, the communications system is operable to store configuration and directory information for messaging systems that are connected to network hubs used in the communications system of the present invention.

Accordingly, if a messaging system is damaged or destroyed, the stored information can be used to reconfigure the repaired system or to initially configure a replacement system. Further, messages to be delivered to the damaged messaging system may be stored in the network hubs of the communications system of the present invention until the damaged messaging system is returned to service so that no messaging traffic is lost during the time required to repair or replace the damaged messaging system.

According to a further embodiment of the present invention, the communications system is operable to provide directory information to messaging systems that are connected to network hubs of the communications system of the present invention but which do not need to use the communications system of the present invention to actually deliver messages. According to this embodiment, a messaging system can present the communications system of the present invention with a request for directory information and the communications system will respond with routing information to enable the attached messaging system to deliver the message without the further intervention of the communications system of the present invention. For large scale integrated network functionality, interfacing with voice messaging systems introduces further complications for providing directory addressing services, in that large distributed network directories must be built and maintained containing address and delivery information which must be accessed based upon numerical addressing and that this information is delivered to the requesting system utilizing DTMF signaling and the native protocols of the user system.

BRIEF DESCRIPTION OF THE DRAWINGS

A more complete understanding of teachings of the present invention may be acquired by referring to the accompanying drawings in which like reference numbers indicate like features and wherein:

FIG. 3 is a data flow diagram illustrating the flow of messages and control information between the software modules used in the network hubs of the present invention;

FIG. 14 is an example of the address translation operation of the communications system of the present invention.

DETAILED DESCRIPTION OF THE INVENTION

Network Structure

Figure 1:
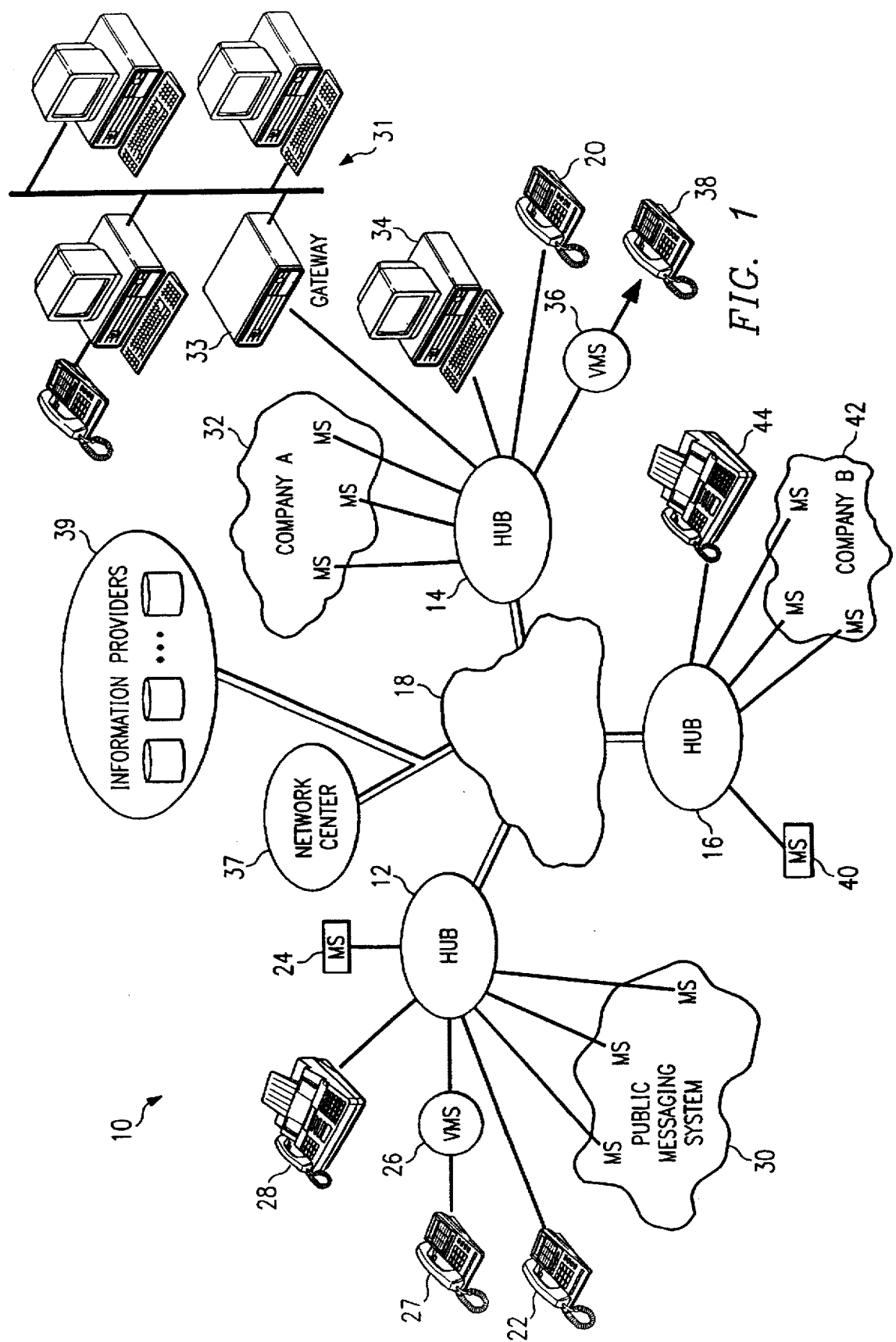
FIG. 1 is a block diagram of the multimedia communications system of the present invention.

FIG. 1 is a block diagram of a multimedia network-based communications system, indicated generally at 10, comprising a number of network hubs 12, 14 and 16. Network hubs 12, 14 and 16 are coupled to one another through a communications network 18 that may comprise, for example, high speed datalinks, frame relay links or other suitable high speed data communication facilities. Communications system 10 operates to process and route communications traffic from a wide variety of message sources and to a wide variety of message destinations. For example, hub system 12 is shown coupled to a telephone 22, a messaging system 24, a conventional voice mail system 26 which is coupled to a large number of telephone terminals represented by telephone 27, a facsimile transmission system 28 and a public messaging network 30. Public messaging system 30 may comprise, for example, messaging services provided to the public by local exchange carrier. In addition, network hub 14 is shown coupled to a private system 32 that itself contains a number of messaging systems and to an electronic mail facility 34. Network hub 14 is also shown coupled directly to a telephone 20 and to a conventional voice mail system 36 which is coupled to a large number of telephone terminals represented by telephone 38. It should be understood that telecommunications connections that are shown as direct connections may actually include intermediate switching facilities such as private branch exchanges or central office switches that are part of private and public telecommunications networks.

Network hub 14 is also shown coupled to a private local area network, indicated generally at 31, which communicates with network hub 14 using a communications gateway 33. Local area network 31 may be used to support a wide variety of messaging operations and may connect user stations having electronic mail capability, facsimile capability, voice capability or video capability. The communications system 10 may be used to connect all these systems with other messaging systems through gateway 33 and network hub 14.

Similarly, network hub 16 is shown coupled to a messaging system 40, a private system 42 comprising a number of messaging systems, and a facsimile transmission and receive facility 44. The network hub systems 12, 14 and 16 are also coupled through the communications network 18 to a network center 37. The network center 37 monitors the operation of the network 10 as will be discussed more fully herein. Information providers 39 are also provided a gateway into the communications system 10 for data and message traffic from information providers 39. Information providers 39 may provide, for example, bulletin board information or mass distributed information services or advertising messages that are distributed to users of the communications system 10 based on the preferences or demographics of the users and the content of the information.

As will be discussed more completely herein, communications system 10 operates to integrate and interconnect disparate sources and technologies of communication traffic and to translate messages between them. The communications system 10 maintains a universal database of all users of the communications system and their individual communications profiles including the various media in which the users can send and receive messages. For example, a single user may control and receive communications using an electronic mail facility, a voice mail facility, a facsimile facility and a video facility. All of these facilities are identified in a user profile record associated with that user within the network database associated with system 10. As will be discussed herein, a copy of that database is maintained in each network hub within system 10 exemplified by network hubs 12, 14 and 16 in FIG. 1. For large scale integrated network functionality, interfacing with voice messaging systems introduces further complications for maintaining individual user profiles in that large distributed network directories must be built and maintained based upon numerical addressing and accessed utilizing DTMF signaling and the native protocols of the user system. The communications system 10 further includes media, protocol, and language translation capabilities such that, for example, messages sent in one media can be received in a different media. For example, an electronic mail message might be sent to a destination user that does not have an electronic mail facility but does have a facsimile facility or prefers the receipt of a facsimile transmission over an electronic mail transmission. Accordingly, the communications system 10 will translate the electronic mail message into a facsimile message and deliver the message to the designated facsimile facility. For large scale integrated network functionality, interfacing with voice messaging systems introduces a further complication for the processing of multimedia messages and the alternate routing in that large distributed network directories must be built containing the numerical addresses for the different media destinations and accessed by the numerical addresses of the users of the communications system, and delivered utilizing DTMF signaling and the native protocols of the user system. In addition, the communications protocols associated with voice messaging systems do not have the ability to request and specify special handling for multimedia messages.

For purposes of describing the advantages of the present invention, all the various sources of and destinations for data traffic coupled to and serviced by the communications system 10 are referred to as "messaging systems" whether they comprise voice mail systems, electronic mail systems, facsimile transmission facilities, video transmission facilities or other data transmission or receipt facilities. As such, for purposes of this description, the data received from such a messaging system is referred to herein as a "message" regardless of its composition. For example, a message received, processed and delivered by the communications system 10 may comprise a voice message, an electronic mail message, a facsimile or video transmission or any combination of medium to form a compound message. As used herein, the "media" of a message refers to the manner in which the message is received or delivered. For example, various message media may comprise voice, electronic mail, facsimile or other graphic images, or video. Further, the "protocol" of a message refers to the manner in which the data comprising the message is encoded by the messaging system from which the message originates to the communications system 10, the manner in which the data comprising a message is encoded as it passes through communications system 10, and the manner in which the data comprising a message is encoded prior to its delivery in order for a destination messaging system to comprehend the message. The term "user" will be used herein to refer to human beings interfacing to the communications system 10 either directly or through messaging systems coupled to communications system 10.

The network hubs such as network hubs 12, 14 and 16 shown in FIG. 1 operate as protocol translation facilities to allow for the connection of the communications system 10 to any of a large number of disparate messaging systems employing differing protocols. Currently, there are a great number of communication protocols which are used by private and public telecommunications and data transmission facilities to interconnect messaging systems. The communications system 10 operates to receive messages and administrative information from messaging systems using the protocol native to that system. The messages and administrative information can then be transmitted to the destination facility using the protocol associated with the destination facility. Certain companies maintain proprietary information delivery protocols that can, if such protocols are made available, be supported by the communications system 10. Further, public domain protocols such as X.400 messaging, SS7 signalling and both digital and analog versions of the audio message interchange specification (AMIS) are also supported by communications system 10. For example, the X.400 protocol includes support for virtually all communications features currently in use. A particular feature set is ordinarily dependent on the features used by a particular messaging system and will usually comprise a subset of the features supported by the X.400 protocol. The communications system 10 is flexible enough to support whatever features are implemented by messaging systems connected to the communications system 10. Additionally, for large scale integrated network functionality, interfacing with voice messaging systems introduces a further complication for the providing of multi-protocol translation capabilities in that messages are delivered utilizing DTMF signaling and numerical addresses. In addition, the communications protocols associated with voice messaging systems do not have the ability to request or specify a translation to a disparate protocol.

The communications system of the present invention also works with a variety of public and proprietary protocols for directory information. As will be discussed more fully herein, some messaging systems may only use the communications system of the present invention as a source of addressing and routing information. In these cases, the messaging system provides the communications system 10 with some information about the intended destination. The communications system 10 then returns specific routing information to the messaging system so that the messaging system can independently contact the destination and deliver the message. In these contexts, the directory information passed between the communications system 10 and the messaging system may use any number of public or proprietary directory information protocols understood by the communications system 10. For large scale integrated network functionality, interfacing with voice messaging systems introduces further complications for providing directory addressing services in that large distributed network directories must be built and maintained containing address and delivery information which must be accessed based upon numerical addressing and that this information is delivered to the requesting system utilizing DTMF signaling and the native protocols of the user's messaging system.

In operation, a network hub such as network hub 12 will receive a message through, for example, messaging system 24 shown in FIG. 1. By way of example, suppose messaging system 24 utilizes the analog AMIS protocol form of DTMF signaling. Further, assume that the message from messaging system 24 is intended for a party serviced by private system 42 which utilizes a proprietary digital communication protocol. Accordingly, network hub 12 would receive the message from messaging system 24 in the analog AMIS protocol. Network hub 12 then transforms the information in the message to conform to a network transmission format and transmits the transformed message through the communications network 18 to hub 16. Network hub 16 then uses the proprietary communication protocol understood by private system 42 to transmit the information to private system 42. In this manner, communications system 10 not only acts to translate the media in which the messages are sent to the destination messaging system, but also acts to provide messaging between dissimilar, proprietary messaging systems by supporting disparate communication protocols. The communications system of the present invention uses a shared internal protocol for all routing and processing of messages. As such, the communications system of the present invention can easily be adapted as new communications protocols, such as Multipurpose Internet Mail Extension (MIME) or the like, become popular. The network hubs that are required to interface with systems utilizing these new protocols need only translate the new protocol to the internal protocol. As such, the operation of the communications system as a whole can support the addition of unlimited new protocols.

The network hub systems within communications system 10 are in constant communication with one another and with the network center 37 to provide updates as to the status of messages within the communications system 10 and further updates as to the user profile information stored in the user database in each network hub. The network center 37 receives these database and status updates and transmits those updates to the remaining hubs in the communications system 10. Due to the constant communication between the hubs, these updates provide for a universal directory of user profiles and a constantly changing body of information as to the status of all messages within the communications system 10. For large scale integrated network functionality, interfacing with voice messaging systems introduces further complications for access and update of user profile information and message tracking in that large distributed network directories must be built and accessed by the numerical addresses of the users of the communications system.

As will be discussed herein, the interconnected network hubs within the communications system 10 also provide for a large amount of virtual storage that is available to the messaging systems which are attached to the communications system 10. In this manner, large bulletin boards or other bodies of shared information can be stored on any of the network hubs and be instantaneously available to any messaging system connected to the communications system 10. For large scale integrated network functionality, interfacing with voice messaging systems introduces further complications for providing bulletin boards or other bodies of shared information services in that large distributed network directories must be built and maintained containing numerical address and access/delivery information for the requesting system utilizing DTMF signaling, numerical addressing and directory information and delivered in the native protocols of the user system.

Network Hub Architecture

Figure 2:
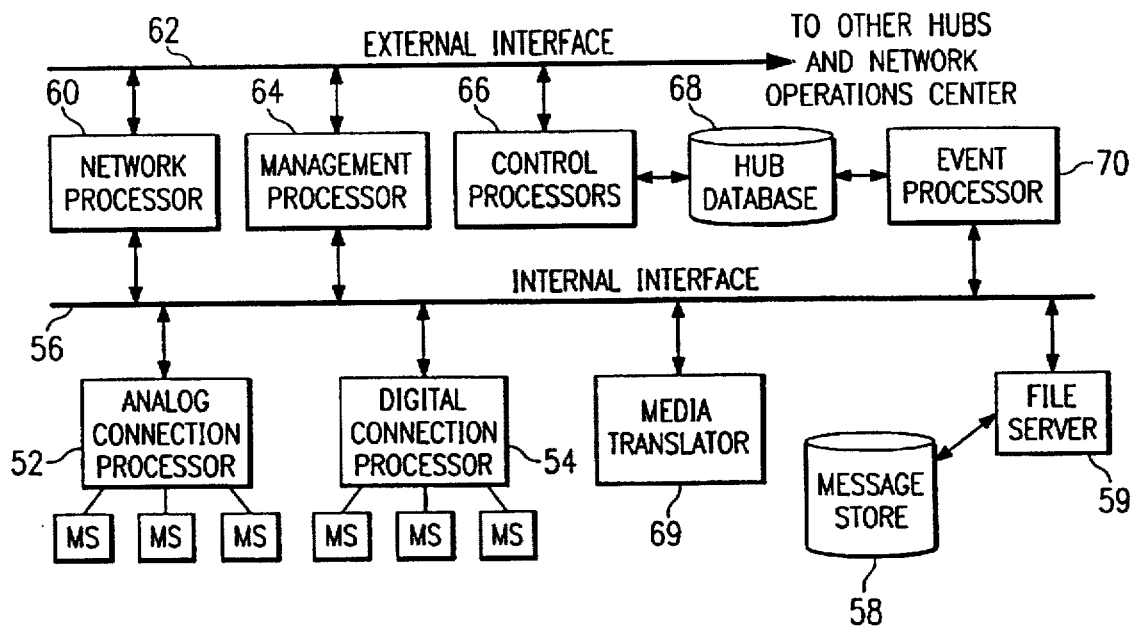
FIG. 2 is a block diagram of the modular software architecture which is used in the network hubs of the present invention.

FIG. 2 is a block diagram of the interrelationship of the various software modules used in the network hubs of the present invention. FIG. 2 illustrates the various modules functioning within a particular network hub such as network hubs 12, 14 and 16 described with reference to FIG. 1 previously. Referring to FIG. 2, connection processors 52 and 54 interact with messaging systems connected to the particular network hub. For example, an analog connection processor 52 communicates with external messaging systems that use analog communication protocols such as an analog communication protocol utilized by a voice messaging system that uses DTMF signaling. Similarly, a digital connection processor 54 communicates with external messaging systems that use digital communication protocols. Although only connection processors 52 and 54 are illustrated in FIG. 2, it should be understood that there are a sufficient number of each of these connection processors for the number of messaging systems coupled to a particular network hub. Connection processors 52 and 54 communicate with the remainder of the software system using, for example, the Transport Control Protocol/Internet Protocol (TCP/IP) through internal interface 56 shown in FIG. 2. Internal interface 56 serves as the main communication link between all of the modules within the software system operating within a particular network hub. Internal interface 56 is also coupled to a file server 59 that provides access to a message store facility 58 which may comprise, for example, a large scale digital storage media such as a hard disk drive. Message store 58 houses the messages received from and to be sent to messaging systems coupled to the network hub. When the media or format of a message must be converted, a media translator 69 is used. Media translator 69 performs media and other forms of translation on messages stored in message store 58. For large scale integrated network functionality, interfacing with voice messaging systems introduces a further complication for providing media and other translation services, in that translation parametrics must be accessed from distributed network directories utilizing numerical addressing methods and that communications protocols associated with voice messaging systems are not able to request or specify media translation services.

A network processor 60 is also coupled to internal interface 56. Network processor 60 is also coupled to a external interface 62 which couples a particular network hub to other network hubs and to the network center 37. Network processor 60 is responsible for collecting and distributing messages to other network hubs. In order to communicate with the other network hubs, the network processor 60 may use, for example, the simple message transport protocol (SMTP) and the MIME protocols.

A management processor 64 is also coupled to both internal interface 56 and external interface 62. Management processor 64 communicates with the network center 37 and the particular network hub and operates to monitor and manage message traffic within the particular network hub. For large scale integrated network functionality, interfacing with voice messaging systems introduces a further complication for tracking of user messages and information, in that messages must be accessed and tracked by the numerical addresses of the users of the voice messaging system.

A group of control processors 66 is coupled between the external interface 62 and a hub database 68. As will be described more completely with reference to FIG. 3, the control processors include a message router 72, a connection manager 74, a data replicator 76 and an administrative event manager 78. In general, the control processors 66 operate to control the operation of the network hub and to manage and manipulate the information stored in the hub database 68. The hub database 68 is also manipulated and coupled to the remainder of the communications system including the internal interface 56 through an event processor 70. The event processor 70 provides the real time control of the network hub components. Event processor 70 responds to directory service requests, identification confirmation requests, analog, digital and network connection requests, message delivery events and administration event queues. For large scale integrated network functionality, interfacing with voice messaging systems introduces further complications for the operations of the control processors, such as message routing, and the operations of the event processor, such as directory service requests, in that large distributed network directories must be built and maintained containing numerical address of the users of the voice messaging system.

Network hubs may be implemented using a variety of hardware platforms depending on the quantity of traffic to be serviced by a particular network hub. In general, the connection processors reside in personal computer platforms serviced by telecommunications peripheral cards. The control processors and database facilities may be implemented on a suitable workstation platform. All of these various discrete hardware platforms may communicate with one another using local area or wide area network systems.

FIG. 3 is a dataflow diagram which illustrates the routing and exchange of various types of data within the various software modules that operate within a network hub. Many of the facilities described with reference to FIG. 2 are shown in more detail in the dataflow diagram of FIG. 3. For example, the control processors 66 are broken out into constituent components. FIG. 3 illustrates the message router 72, the connection manager 74, the data replicator 76 and the administrative event manager 78. As shown in FIG. 3, each of these control processors 66 interacts with the hub database 68 through database access procedures which may comprise, for example, SQL/stored procedures. Essentially, the various software modules may interface with the control processors 66 through communications mechanisms that may comprise, for example, TCP/IP sockets or remote procedure calls.

Event processor 70 interacts with network processor 60, analog connection processor 52, media translator 69, and digital connection processor 54 using a suitable hub control protocol. The hub control protocol may comprise a suitable interprocess communication mechanism that provides client-server, request-response communications. The hub control protocol may be based, for example, on remote procedure calls or TCP/IP sockets. The media translator 69 accesses messages in message store 58 through file server 59 to perform media and format conversions as discussed previously.

Management processor 64 interacts with network processor 60, analog connection processor 52, digital connection processor 54 and event processor 70 using a suitable management protocol which may comprise, for example, SNMP proxy or SNMP sub-agent communications. Network processor 60, analog connection processor 52, and digital connection processor 54 interact with message store 58 through file server 59 through the storage and retrieval of messages that may utilize, for example, MIME. Finally, network processor 60, analog connection processor 52, digital connection processor 54, management processor 64 and data replicator 76 communicate with other network hubs, messaging systems, or the network center 37 using messaging protocols or directory protocols appropriate to the destinations connected to these facilities. For large scale integrated network functionality, interfacing with voice messaging systems introduces a further complication for the network hub operations, in that large distributed network directories must be built and maintained containing numerical addresses of the users of the messaging systems.

Network Hub Storage Facilities

Each network hub comprises two data storage facilities described previously. Each network hub comprises a hub database 68 and a message store 58. As described previously, the message store 58 serves to store inbound and outbound messages and is accessed through a file server 59. The hub database 68 comprises a high performance database for the storage of accounting information, directory service requests, identification confirmations, routing information and queue services information. For large scale integrated network functionality, interfacing with voice messaging systems introduces a further complication for the network hub database in that large distributed network directories must be built and maintained containing numerical addresses of the users of the communications system. As will be discussed herein, the hub database 68 includes a variety of administrative queues including inbound and outbound message queues that do not contain actual messages but contain delivery information for the messages stored in message store 58. Software modules that are distributed in nature will access the message store 58 through file server 59 by use of a network file system or other suitable data transport protocols.

The hub database 68 comprises a high performance database. In order to provide flexibility to the operation of the network hub, access to the hub database 68 is provided by a query requestor. A query responder receives abstracted queries from the various software modules through the network remote procedure calls. These calls are translated and answered by the query responder. By using this architecture, the hub database 68 can be altered by simply changing the query responder.

The analog connection processor 52, the digital connection processor 54 and the network processor 60 access the messages stored in message store 58 using file server 59 as necessary. The messages in message store 58 are also accessed by the media translator 69 through file server 59. The media translator 69 performs the translations of messages from one media to another such as, for example, the translation of an electronic mail message into a voice message using a text to speech system. The operation of media translator 69 will be discussed more fully with reference to FIG. 11.

Analog Connection Processor

Figure 4:
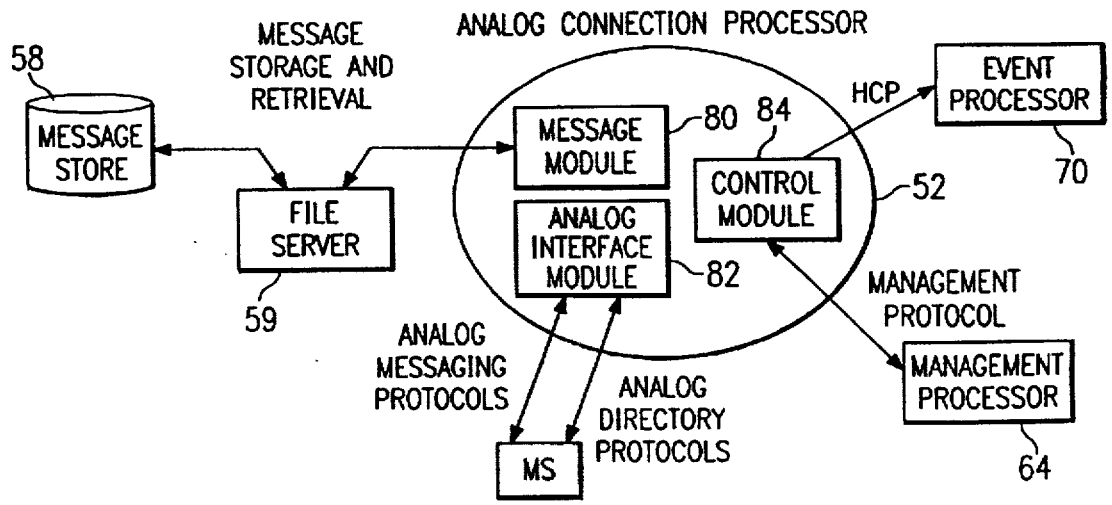
FIG. 4 is a block diagram of an analog connection processor used in the communications system of the present invention.

FIG. 4 is a block diagram of the operation of the analog connection processor 52 discussed with reference to FIGS. 2 and 3 previously. According to one embodiment of the present invention, analog connection processor 52 is responsible for collecting and distributing various forms of messages from analog connected messaging systems using analog networking protocols such as analog AMIS. For large scale integrated network functionality, interfacing with voice messaging systems introduces a further complication to the analog connection processor's functionality, in that the communications system must support standard telephone interfaces, and support numerical addressing and access/deliver information to the requesting system utilizing DTMF signaling, and further support the native protocols of the attached voice messaging system. The analog connection processor 52 runs on a hardware platform that may comprise, for example, a 486-ISA bus personal computer system running the Unix, Windows NT, or SOLARIS operating systems. This hardware platform may, contain a plurality of voice, fax, and modem processing cards as well as other forms of interface cards to process other forms of analog data transport. The hardware platform may also contain a high performance network adaptor card such as an Ethernet adaptor for connecting to the remainder of the facilities within a particular network hub. The hardware platform for analog connection processor 52 also comprises disk drive storage for storage of operating system files such as the UNIX operating system plus sufficient temporary storage space to hold incoming and outgoing messages.

Referring to FIG. 4, the analog connection processor 52 is shown to comprise three internal modules. A message module 80 allows the analog connection processor 52 to communicate with the message store 58 described previously through file server 59. An analog interface module 82 provides a communication link between the analog connection processor 52 and messaging systems using analog messaging protocols. A control module 84 allows the analog connection processor 52 to communicate with the management processor 64 using a management protocol. Control module 84 also communicates with event processor 70 as described previously using the hub control protocol.

Figure 5:
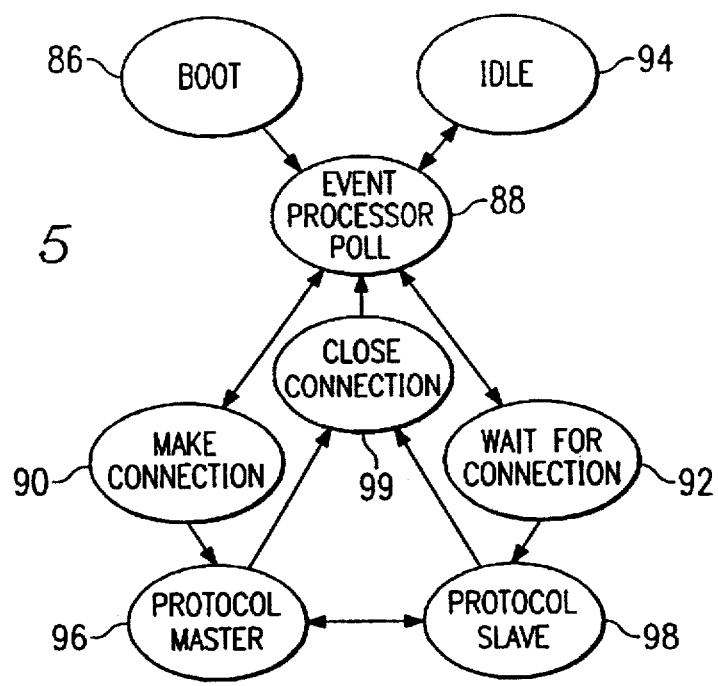
FIG. 5 is a state diagram of the analog connection processor, the digital connection processor and the network processor used in the communications system of the present invention.

FIG. 5 is a state diagram illustrating the operation of analog connection processor 52. Processing begins at a Boot state 86 which is automatically entered upon power-up of the analog connection processor 52 or upon either a hardware or a software reset condition. After the operating system and application software are successfully loaded in the analog connection processor 52, the analog connection processor 52 exits the Boot state 86 and passes to the event processor poll state 88. The event processor poll state is an idle state where the analog connection processor 52 waits for direction from the event processor 70 described previously as to which task the analog connection processor should perform. If while in the event processor poll state 88 the event processor 70 instructs the analog connection processor 52 to create a connection with a messaging system, the analog connection processor 52 leaves state 88 and passes to the make connection state 90 shown in FIG. 5. In state 90, the analog connection processor 52 establishes a connection and confirms that the connection has been made.

The event processor 70 may also direct the analog connection processor 52 while in the event processor poll state 88 to wait for inquiries from messaging systems. If this is the case, the analog connection processor 52 passes to the wait for connection state 92 shown in FIG. 5 where the analog connection processor 52 will remain until a predetermined amount of time has expired or a connection is made with a calling messaging system or network facility. The event processor 70 can also cause the analog connection processor 52 to pass from the event processor poll state 88 to an idle state 94. The idle state 94 is used by the control processors 66 and event processor 70 to hold a communication port in reserve for outgoing calls or otherwise prevent new calls from being received by the analog connection processor 52. In general, a predetermined percentage of the communication ports available to the network hub are maintained in the idle state 54 to provide a pool from which outgoing connections are made in order to deliver messages or directory information. The analog connection processor 52 remains in the idle state 94 until a predetermined amount of time has expired and then the analog connection processor 52 returns to the event processor poll state 88.

After a connection has been completed and authenticated in the make connection state 90, the analog connection processor 52 passes to the protocol master state 96. The protocol master state 96 is the message sending state where messages or directory information are delivered to a messaging system. Once in the protocol master state 96, the analog connection processor 52 continues to deliver all messages and directory information provided by the control processors 66 to the connected messaging system. At certain times during the connection, the analog connection processor 52 offers to pass to a protocol slave state 98, where it may receive messages, directory information, or other data from the messaging system. If no messages, directory information or data need to be received at that time, the analog connection processor 52 passes from the protocol master state 96 to a close connection state 99 where the connection with messaging system is terminated. Processing then returns to the event processor poll state 88.

The protocol slave state 98 is the message receiving state for the analog connection processor 52. When in the protocol slave state 98, the analog connection processor 52 receives and validates messages, directory information and data transmissions from a messaging system. The analog connection processor 52 remains in the protocol slave state 98 until no more messages, directory information, or other data are provided by the messaging system. At that time, the analog connection processor 52 returns to the event processor poll state 88 through the close connection state 99 described previously.

Digital Connection Processor

Figure 6:
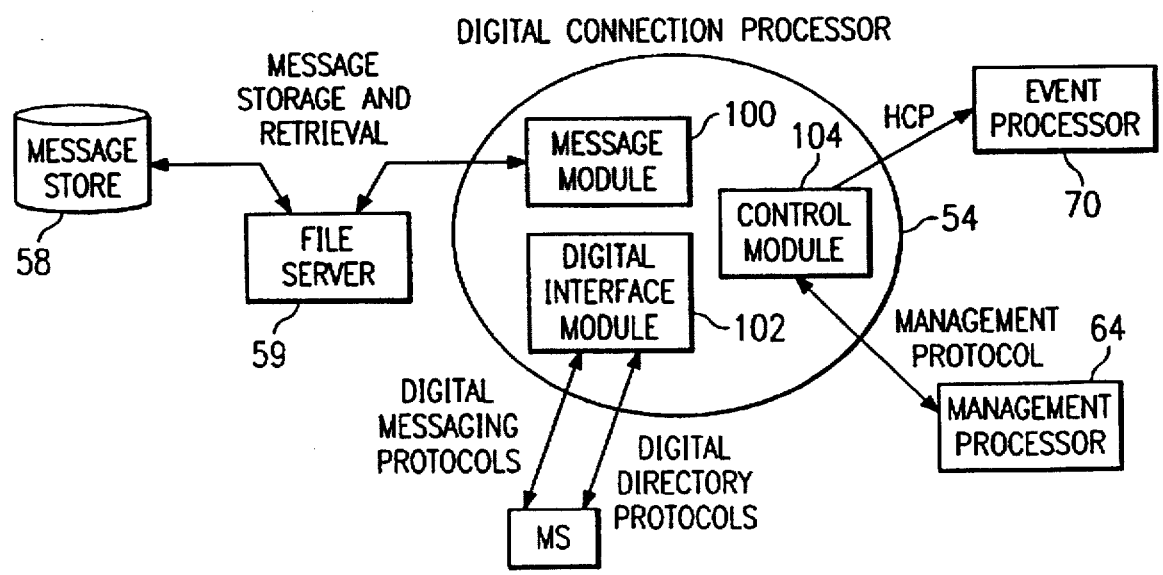
FIG. 6 is a block diagram of the digital connection processor used in the communications system of the present invention.

The digital connection processor 54 operates similarly to the analog connection processor 52 previously described. FIG. 6 is a block diagram which illustrates the functional modules contained within digital connection processor 54. Digital connection processor 54 comprises a message module 100 which facilitates communication between the digital connection processor 54 and the message store 58 through file server 59. Digital connection processor 54 also contains a digital interface module 102 which facilitates communication between digital connection processor 54 and messaging systems that utilize digital protocols such as digital AMIS, SMTP-MIME, cc: Mail and external service providers such as Internet and MCI MAIL.

Digital connection processor 54 further comprises a control module 104 that facilitates communication using hub control protocol with the event processor 70. The control module 104 also communicates with the management processor 64 using the management protocol.

The digital connection processor 54 is responsible for collecting and distributing voice, fax, E-mail and other media messages from digitally-connected messaging systems using digital network protocols. According to one embodiment of the present invention, the digital connection processor 54 also provides and receives directory update services using digital directory protocols such as X.500 and other digital directory protocols. The digital connection processor 54 may be implemented on a personal computer platform which may comprise, for example, a 486-ISA bus personal computer or SPARC system running the Unix, Windows NT, or SOLARIS operating systems. The digital connection processor 54 platform supports a variety of interface systems such as conventional modems for dial-in directory service and mail submission, and directory information queries and Ethernet connections to provide for wide area network Ethernet connections and local area network connection 50 described previously with reference to FIG. 2. Similar to the analog connection processor 52, the digital connection processor 54 also contains a disk drive facility for storage of an operating system such as the UNIX operating system plus sufficient storage to temporarily hold incoming and outgoing messages.

In operation, the digital connection processor 54 uses the identical states described with reference to FIG. 6 and the operation of the analog connection processor 52.

Message Format

Both the analog connection processor 52 and the digital connection processor 54 are responsible for accepting and validating incoming messages. For large scale integrated network functionality, interfacing with voice messaging systems introduces a further complication to the internal message format in that the communications system must support standard telephone interfaces and support messages that are typically large, spanning several minutes of digitized analog audio signals. The delivery of these messages involve a translation or conversion of the message. For example, the message may need to be translated into a different media. Data transmissions that are received may need to be converted from one format to another. As will be discussed more completely with reference to FIG. 11, these conversions and translations are performed by media translator 69. In part, these functions are accomplished by encapsulating all received message data with a standard message wrapper to form a message for transport and storage within the communications system 10. This wrapper may be based, for example, on MIME encapsulation protocol. Many messages received by the communications system 10 already include a message wrapper. These messages are also converted to the standard internal message format. This format tags and labels each message media within a message with the addressing information provided by the sender. Each message contains a date field which comprises the time the message was sent as provided by the message submission protocol or, in the alternative, as provided by the communications system of the present invention. Each message also contains a "from" field where both the network identification of the message sender and the message sender's messaging system identifier are combined into an Internet style address. Each message also contains a "to" field where the network identification of the intended recipient and the messaging facility of the intended destination facility are combined into an Internet style address. Each message also receives a unique message identification field for use in administrative tracking of messages and other administrative concerns.

Various delivery features which will be discussed herein, such as privacy and urgency are usually not identified in the message itself. Rather the presence of these requirements are sent to the control processors 66 when a received message is placed in a message queue within the hub database 68.

Network Processor Operation

Figure 7:
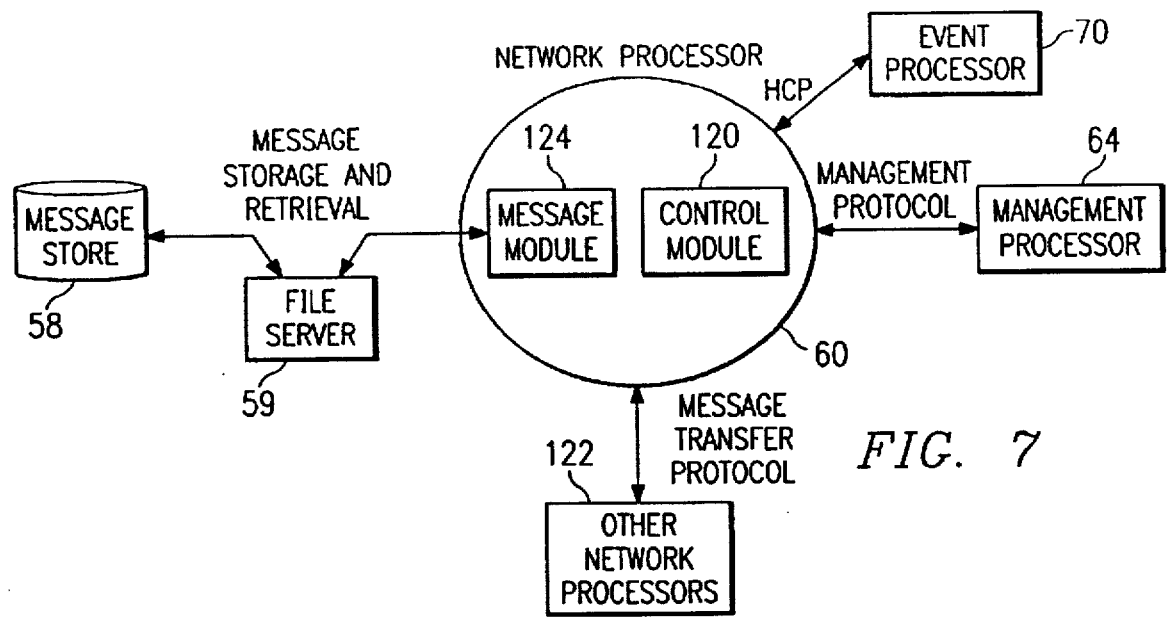
FIG. 7 is a block diagram of the network processor used in the communications system of the present invention.

FIG. 7 is a block diagram which illustrates the functional modules used by the network processor 60. The network processor 60 contains a control module 120 which allows the network processor module to communicate with the event processor 70, the management processor 60, and other network processors 122 shown in FIG. 9. The network processor 60 also includes a message module 124 which facilitates communication with the message store 58 through file server 59. While the network processor 60 can be a stand-alone hardware platform similar to the analog connection processor 52 and the digital connection processor 54, under one embodiment of the present invention, the network processor 60 is implemented as a task on a central server that connects to the internal interface 56 and that contains the remaining storage facilities such as message store 58, file server 59, and hub database 68. The network processor 60 communicates with other resources in the network hub using three data paths. Control and query information exchanges between the network processor 60 and the event processor 70 are exchanged using the hub control protocol. Operational monitoring statistics and state information are exchanged with the management processor 64 using the management protocol. Messages are passed into and out of message store 58 using file server 59.

The network processor 60 is responsible for collecting and delivering messages to other network hubs within the communications system 10. In operation, the network processor 60 uses the identical states described with reference to FIG. 6 and the operation of the analog connection processor 52. For large scale integrated network functionality, interfacing with voice messaging systems introduces further complications for the network processor operation in that large distributed network directories must be built and maintained containing numerical addresses of the users of the communications system.

Event Processor Operation

Figure 8:
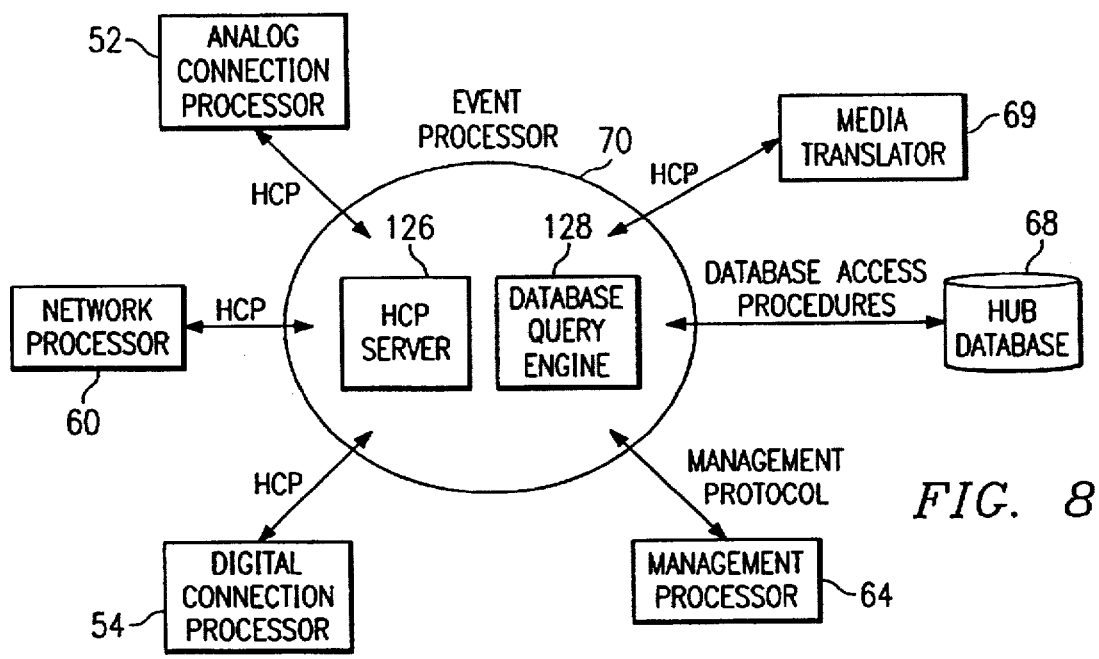
FIG. 8 is a block diagram of the event processor used in the communications system of the present invention.

FIG. 8 is a block diagram which illustrates the functional components of the event processor 70. Event processor 70 comprises a hub control protocol server 126 which receives remote procedure calls from one or more analog connection processors 52, network processors 60 and digital connection processors 54. Event processor 70 also comprises a database query engine 128 which operates to interrogate and manipulate the hub database 68 to service remote procedure calls from one or more analog connection processors 52, network processors 60 and digital connection processors 54. The event processor 70 also interfaces with the management processor 64 using the management protocol. The event processor 70 also interfaces with the media translator 69 to direct the conversion of messages accessed by the media translator 69 from the message store 58 using file server 59. For large scale integrated network functionality, interfacing with voice messaging systems introduces further complications for the event processor operation in that large distributed network directories must be built and maintained containing numerical addresses of the users of the communications system.

Figure 9:
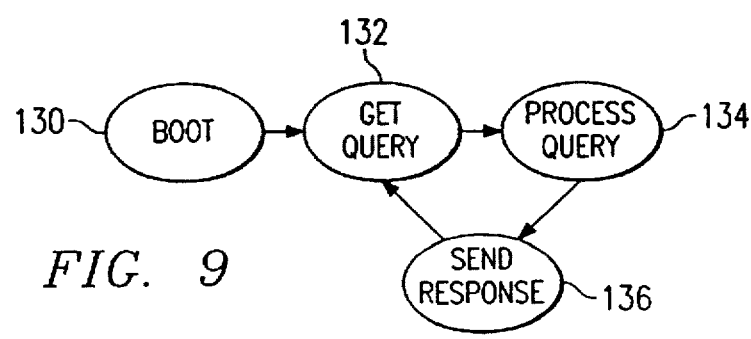
FIG. 9 is a state diagram of the event processor used in the communications system of the present invention.

FIG. 9 is a state diagram illustrating the operation of the event processor 70. Processing within event processor 70 begins in a boot state 130 which is entered upon power-up or reset of the communications system. When the appropriate applications, programs and operating systems are loaded, the operation of event processor 70 passes from boot state 130 to a get query state 132 where the event processor 70 remains waiting for remote procedure calls from analog connection processor 52, network processor 60 or digital connection processor 54, or management protocol queries from management processor 64. Upon receipt of such a query, the event processor 70 passes to a process query state 134 where the database query engine 128 accesses the hub database 68 using database access procedures. The response is received from the hub database 68 in process query state 134 and the event processor 70 passes to a send response state 136 where the appropriate response is forwarded to one of the processors 52, 54, 60, or 64 described previously. The event processor 70 then returns to the get query state 132 where it remains until an additional request is forwarded to the event processor 70.

Control Processor Architecture

Figure 10:
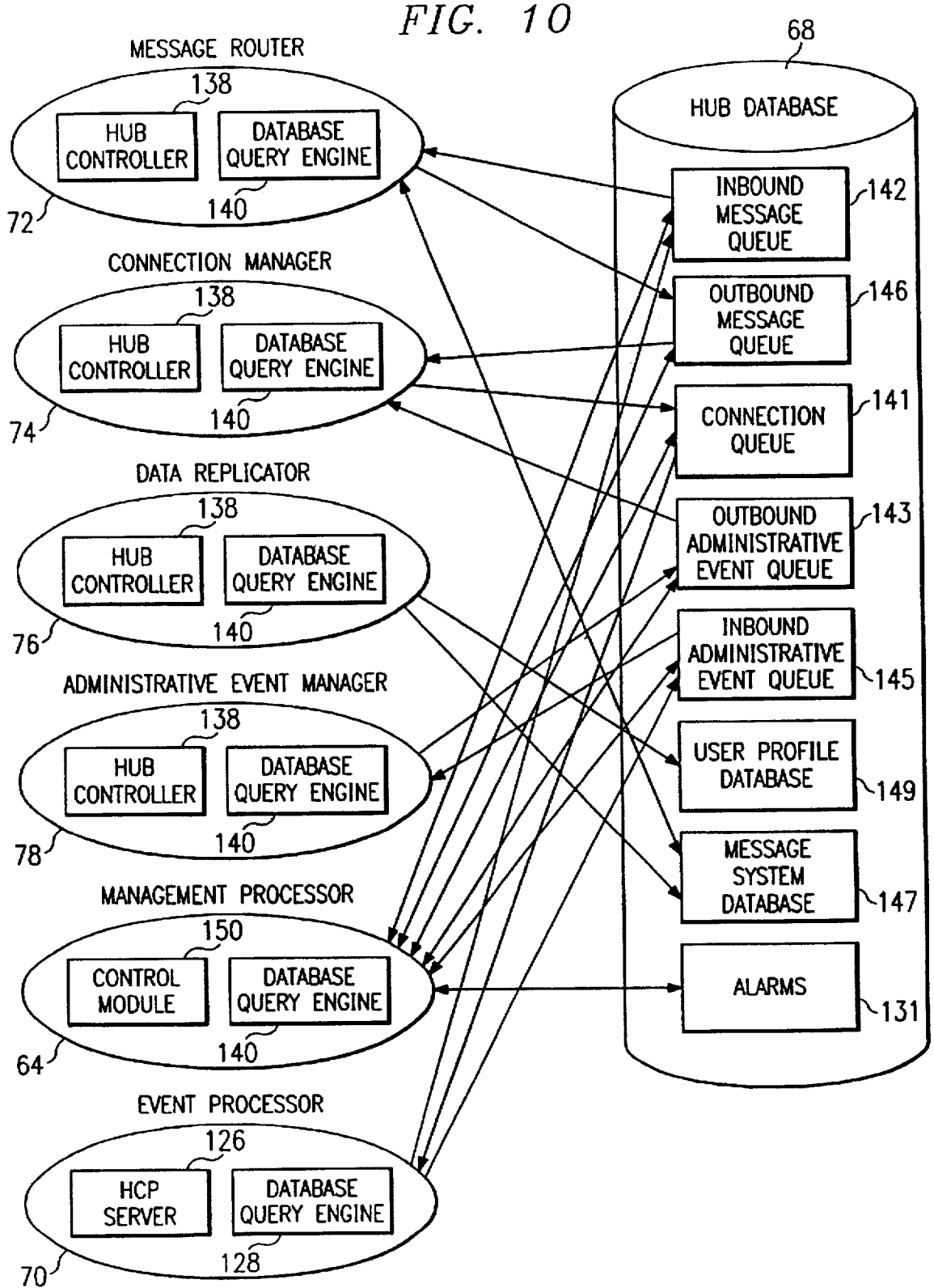
FIG. 10 is a block diagram of the control processors, management processor, event processor, and databases used in the communications system of the present invention.

As shown in FIG. 10, each of the control processors 66 illustrated in FIG. 3 shares a common architecture. The message router 72, the connection manager 74, the data replicator 76, and the administrative event manager 78 each control a collection of tasks responsible for the actions of the network hub. Overall control of the network hub is achieved through control of the hub database 68 and specifically the message queues and administrative event queues contained within the hub database 68. In this manner, control is achieved by prioritizing events stored in the message and administrative event queues and creating and manipulating entries in these queues to be read by the event processor 70. The event processor 70 is the actual real time engine of the network hub.

FIG. 10 is a block diagram which illustrates the architecture of each of the control processors 66, the management processor 64 and the event processor 70, and the manner in which these entities interact with the various portions of the hub database 68. Each of the control processors comprises a hub controller module 138 and a database query engine 140. The hub controller 138 administers the tasks to be stored in the hub database 68 and communicates with the hub database 68 through the database query engine 140 using database access procedures.

Message Router Operation

The message router 72 comprises a hub controller 138 and a database query engine 140. The message router 72 interacts with an inbound message queue 142, an outbound message queue 146, and a message system database 147. In general, the message router 72 uses information from the message system database 147 to determine the next destination for each message passing through the network hub. As discussed previously, the message itself is actually stored in the message store 58 and is accessed using the file server 59. The inbound message queue 142 and the outbound message queue 146 store message records which indicate the location of the message within message store 58 as well as the source and destination of each message. The message router 72 reads message records from inbound message queue 142 after they have been placed there by event processor 70. The message router then determines the next destination for the messages associated with the message record and creates a new message record and places that message in outbound message queue 146.

The message router 72 is also responsible for prioritizing messages and, in the case of future delivery, delaying messages. In general, messages are ranked and delivered in order of priority. Efficient use of the communication system 10 of the present invention requires the ability to shape the messaging traffic into a somewhat constant volume. This traffic shaping is achieved by having the message router 72 selectively delay messages as needed until the network is less loaded. To accomplish this, the message router 72 attaches an internal priority for each message. The internal priority for the communications system is set by both the urgency specified by the submitted messages and how long it has been since the message was received for delivery. For large scale integrated network functionality, interfacing with voice messaging systems introduces a further complication for the message router operation, in that large distributed network directories for the hub database 68 must be built and maintained containing numerical addresses of the users of the communications system.

Connection Manager Operation

The connection manager 74 also contains a hub controller 138 and a database query engine 140. The connection manager 74 reads the message records within outbound message queue 146 and determines the nature of the connection that must be made to service each message record within outbound message queue 146. Connection queue records associated with these connections are formatted and placed in a connection queue 141 within hub database 168. The connection manager 74 also reads administrative event records from an outbound administrative event queue 143 and determines if connections within the network are required to service the administrative event records within outbound administrative event queue 143. If network connections are required, a record is similarly formatted and placed in connection queue 141. For large scale integrated network functionality, interfacing with voice messaging systems introduces further complications for the connection manager operation in that the message records within the inbound and outbound message queues, the administrative event records within the administrative event queue, and the connection queue records within the connection queue must be built, maintained, and accessed using the numerical addresses of the users of the communications system.

The connection manager 74 controls the connections between each network hub, the network center 37, and each messaging system. The connection manager 74 creates connection queue records for each message and administrative event within the outbound message queue 146 and outbound administrative event queue 143 of the hub database 68. The connection manager 74 manages conventional connections and also determines when multiple connections are needed and when failed connections should be retried. The connection manager 74 is triggered by any record within the outbound message queue 146 or the outbound administrative event queue 143. The connection manager 74 may also alternatively engage in periodic scans of all the queues within the network hub to reprioritize the connection queue 141 based on the number of events and the priority of events waiting to occur.

As discussed previously, the connection manager 74 maintains the connection queue 141 which comprises a list of destinations for which a connection needs to be made. These connections may be scheduled for a particular time or as necessary according to a priority based on the number of messages, the oldest message in a particular queue, or the last time the connection was made. The connection queue 141 is accessed by the event processor 70 to determine the next operation for a newly available communication port. The connection queue 141 is periodically updated by the connection manager 74 with a connection priority indication. Each connection queue record is marked with an overall priority indication based on the highest priority message in the connection queue 141 and a count of the number of messages in the connection queue 141.

These priority indications are Immediate, High, Normal, or Low. Immediate indicates that one or more events scheduled in the connection queue 141 for a given destination are overdue. High indicates that one or more events scheduled for a given destination have a high internal priority and that a connection to a destination should be made as soon as a connection becomes available. Once a connection is established and the High priority messages are sent, other messages may be sent if the load on the connection permits. The Normal priority indicates that no events scheduled with High priority are resident in the connection queue 141 and at least one Normal priority event is resident in the connection queue 141. The connection manager will open a connection if a connection is free and there are no pending High priority events in the connection queue 141. Once the connection is established and the Normal priority message has been sent, the Low priority events can be processed if load permits. The Low priority indication occurs when only scheduled events of Low priority are resident in the connection queue 141. The connection manager will open a connection is a connection is free and there are no remaining Normal, High, or Immediate priority connections required.

The Low priority messages will escalate to a Normal priority if they remain in the connection queue 141 for a predetermined amount of time, for example, two hours.

Efficient operation of the communications system 10 relies on efficient queue management by the connection manager 74. Because a connection processor such as analog connection processor 52, digital connection processor 54 or network processor 60 can change roles on the same connection, the connections between network hubs are prioritized by the total volume of traffic to be exchanged. In addition, in the event that connections are scarce, interacting network hubs attempt to contact each other, increasing the likelihood that a successful connection will be made. In order to facilitate this interaction, a reservation methodology is implemented. When the connection manager 74 creates a connection record within connection queue 141, in addition to adding the delivery information record to the connection queue 141, a similar entry is sent to the remote network hub that is connected to the destination messaging system. In this manner, both the local network hub and the remote network hub know that a connection must be made and contact attempts can be initiated by either network hub. Once a message connection is established, either through the normal processing of the message queues or by the attempts of the network hubs to contact each other, both network hubs can use the connection to deliver all messages to each other.

Administrative Event Manager Operation

The administrative event manager 78 handles administrative events in the same manner that the message router 72 handles message records. Administrative event manager 78 comprises a hub controller 138 and a database query engine 140. Administrative event manager 78 reads entries from the inbound administrative event queue 145 which have been placed there by event processor 70. Administrative event manager 78 then determines if an administrative event message must be sent to another network hub within the communications system 10 or if a message must be sent to the network center 37. If an administrative event message must be sent to any of these locations, an entry is made in the outbound administrative event queue 143. For large scale integrated network functionality, interfacing with voice messaging systems introduces further complications for the administrative event manager operation in that the administrative event records within the administrative event queue must be built, maintained, and accessed using the numerical addresses of the users of the communications system.

Data Replicator Operation

As discussed previously, the data replicator 76 is responsible for the queuing and transport of database change events. The data replicator 76 manages the user information updates for the hub database 68 and processes database change events when they are received from the master database stored in the network center 37. The data replicator 76 insures that the message system database 147 and user profile database 149 within hub database 68 remain synchronized with the master database in the network center 37.

The data replicator 76 also comprises a hub controller 138 and a database query engine 140. The data replicator 76 operates to input new information into a user profile database 149 and the message system database 147. The data replicator 76 receives the updated information from the network center 37 and downloads the information to the user profile database 149 if the information involves new user profile information or downloads the information to the message system database 147 if the new information comprises configuration information for message systems attached to the communications system 10. The data replicator 76 processes information which is transmitted to all network hubs for updates to the user profile database 149 and the message system database 147. In contrast, the administrative event manager 78 accepts updated information from the network center 37 which comprises information which is specific to the particular network hub. In addition, the administrative event manager 78 accepts requests for information from the network center 37 for information which is stored on messaging systems connected to the network hub housing the administrative event manager 78.

Management Processor Operation

Although the architecture of the management processor 64 will be discussed in detail in FIG. 11, its interaction with hub database 68 is shown in FIG. 10. The management processor 64 contains a control module 150 and a database query engine 140. The management processor 64 interacts with an alarms database 131 within hub database 68. The alarms database 131 comprises a list of events that occur within the network hub processing and in some cases the time at which these events occurred. The list of events stored in the alarms database 131 can be used by systems within the network center 37 to track down errors in the processing of messages and to maintain control over when events occur or when events have occurred within the processing of messages within a particular hub.

The management processor 64 also interacts with the inbound message queue 142, the outbound message queue 146, the connection queue 141, the outbound administrative event queue 143, and the inbound administrative event queue 145 as necessary to monitor these queues. The management processor 64 is operable to reorder and delete entries in the queues discussed previously as necessary to repair errors and expedite messages. For large scale integrated network functionality, interfacing with voice messaging systems introduces further complications for the management processor operation in that the accessing, updating, deleting, and reordering of the inbound and outbound message queues, the inbound and outbound administrative event queues, and hub alarm event tables must be performed using the numerical addresses of the users of the communications system.

Event Processor Operation

As discussed previously with reference to FIG. 8, the event processor 70 comprises an HCP server 126 and database query engine 128. The event processor 70 places message records within inbound message queue 142 as they are received into the network hub. Similarly, the event processor 70 places administrative event records into the inbound administrative event queue 145 as they are received into the network hub. The event processor 70 consumes the connection queue 141 as it makes connections to enable the passing of messages out of the particular network hub. For large scale integrated network functionality, interfacing with voice messaging systems introduces further complications for the event processor operation in that inputting message records into the inbound message queue and administrative event records in the inbound administrative event queue, and retrieving records from the connection queue must be performed using the numerical addresses of the users of the communications system.

Management Processor Architecture

Figure 11:
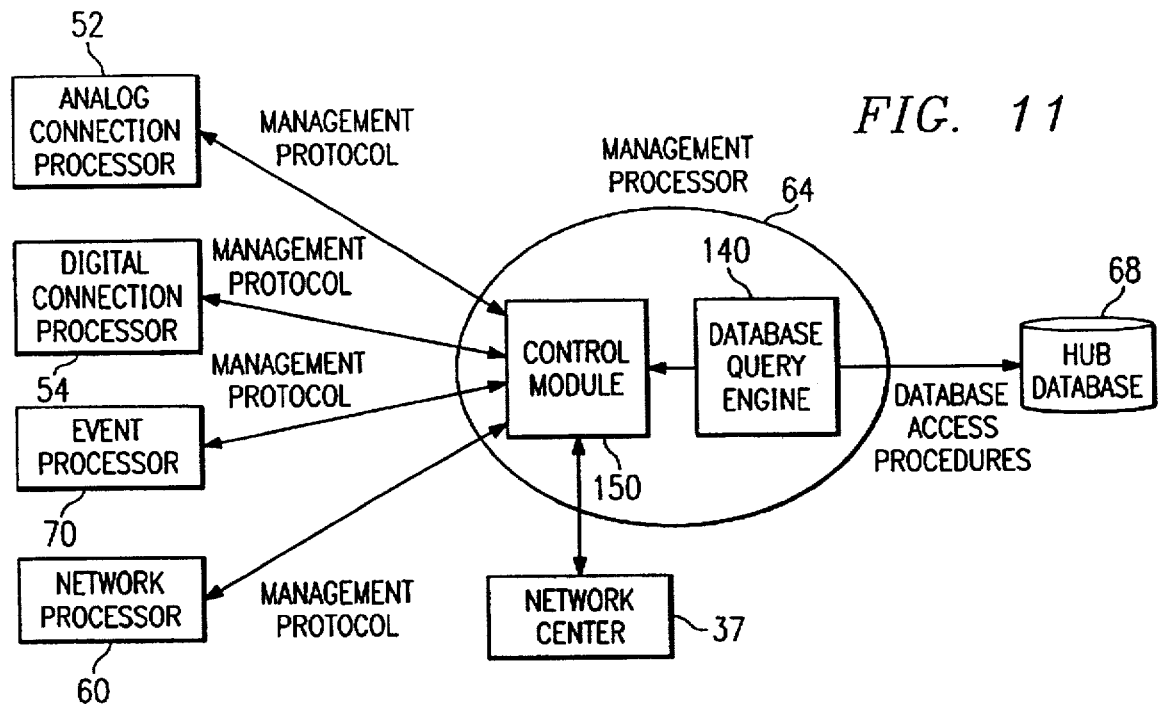
FIG. 11 is a block diagram of the management processor used in the communications system of the present invention.

FIG. 11 is a block diagram which illustrates the functional components and interactions of the modules comprising the management processor 64. Management processor 64 comprises a control module 150 which interacts using the management protocol with the analog connection processor 52, the digital connection processor 54, the event processor 70 and the network processor 60. The control module 150 also interacts with the hub database 68 and, specifically the alarms database 131, using database access procedures. The management processor 64 acts as the chief liaison between the network hubs and the network center 37. Management processor 64 also receives Customer Service, HelpLine inquiries and directives from the network center 37 using the management protocol. As will be discussed more completely herein, the communications system 10 has the capability of being able to continually track and manage messages within communications system 10. The HelpLine operation allows for messages to be rerouted or terminated after they have been placed in communications system 10 and before they have been delivered. These directives are transmitted to the management processor 64 using the management protocol from the network center 37.

Media Translator

Figure 12:
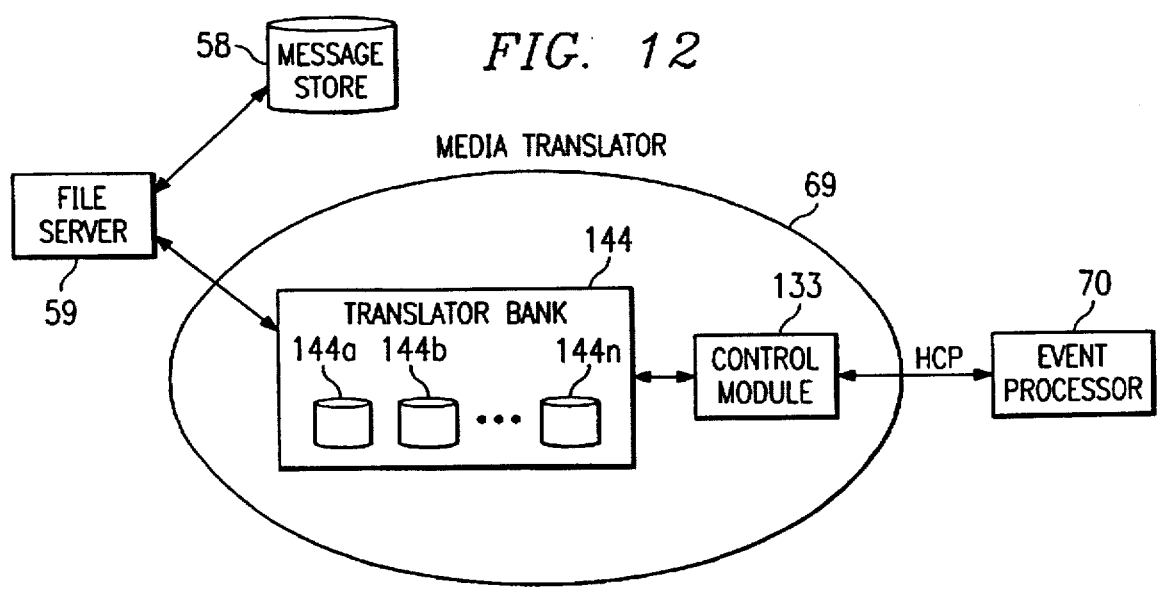
FIG. 12 is a data flow diagram of the media translator used in the communications system of the present invention.

FIG. 12 is a block diagram which illustrates the functional components and interactions of the modules comprising the media translator 69. Referring to FIG. 12, media translator 69 comprises a control module 133 and a translator bank 144. The control module 133 interacts with the event processor 70 using the hub control protocol. The translator bank 144 receives messages from the message store 58 by making requests to file server 59. The translator bank 144 operates to convert the format of data and to translate the media of messages. The messages processed by translator bank 144 are then returned to message store 58 using file server 59. Translator bank 144 comprises a plurality of translators indicated as 144a–n in FIG. 12. Each of the translators 144a–n within translator bank 144 accomplish a stage of the conversion to be performed by translator bank 144. Each translation or conversion is done by first converting the message or data into a high quality internal format that contains sufficient data representation to insure that no data is lost during the conversion process. Translations of messages from one media to another are performed while the message is represented in the internal format. In this manner, the translator bank 144 need only contain a minimum number of media to media translators. In summary, the control module 133 can cause the translator bank 144 to use many different filters in sequence to accomplish any permutation of media-to-media translation, message-to-message transformation or data-to-data conversion.

The communications system of the present invention offers a ubiquitous messaging service which provides for the delivery of messages to messaging systems of various technologies using their native protocols and allows a recipient to select, where practical, the preferred media for receiving messages. In order to offer this facility, the communications system of the present invention is able to communicate with messaging systems using various messaging protocols used by current messaging systems. For large scale integrated network functionality, interfacing with voice messaging systems introduces further complications for the communications system of the present invention, and especially the media translator in that the user profile records must be accessed to perform media translation selection because the communications protocols associated with voice messaging systems are not able to indicate the necessity or to specify the nature of media translation services required.

Each network hub also includes the ability to translate messages into various forms of message media. These media translation features include the ability to translate text to speech, facsimile images to text and text images, text and text images to facsimile images, and speech to text. These media translation capabilities can also be combined for a single message. For example, to the extent that speech is required to be translated into a facsimile image, the data is first translated into text and then into a facsimile image of the text.

As discussed previously, media translation may be accomplished according to the desires of the message recipient. In addition, media translation can occur automatically responsive to the needs of a destination messaging system. For example, if a destination messaging system comprises a simple voice message system with no data, facsimile or capability other than voice, all messages to such voice message system can be translated to voice messages regardless of the media in which the message was sent. In this particular example, the communications system of the present invention would translate all non-voice messages to a textual format and utilize a text to speech converter to create the final, deliverable voice message.

Network Center

Figure 13:
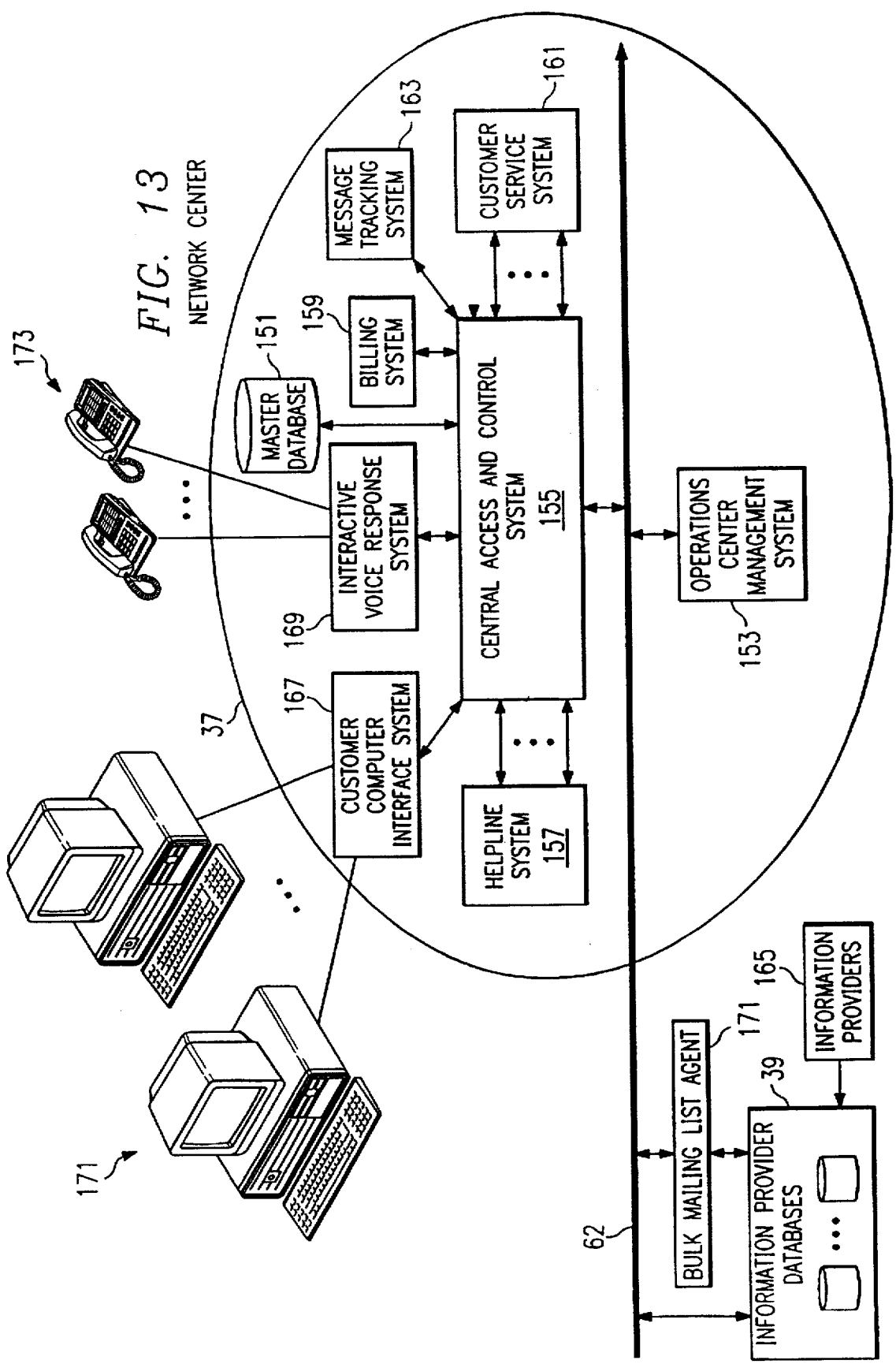
FIG. 13 is a block diagram of the network center used in the communications system of the present invention.

FIG. 13 is a schematic block diagram of the components of the network center 37 used in the communications system of the present invention. The network center 37 communicates with the remainder of the communications system 10 through external interface 62 which is connected to or a part of communications network 18. The network center 37 further comprises an operations center management system 153 and an central access and control system 155 coupled to external interface 62. The central access and control system 155 is coupled to a HelpLine system 157, a customer service system 161, a billing system 159, a message tracking system 163, a customer computer interface system 167, a master database 151, and an interactive voice response system 169.

As discussed previously, master database 151 operates as a central repository for all user information, message system information, and message status information that is used by the network hubs to manage messages within communications system 10.

The central access and control system 155 comprises the interface to the remainder of the communications system for the master database 151, the HelpLine system 157, the billing system 159, the message tracking system 163, the customer service system 161, the customer computer interface system 167 and the interactive voice response system 169. The customer service system 161 supplies information as to additions and changes to the user databases and message system databases. Customer service system 161 can also serve as a gateway for questions requiring the use of the billing system 159. The HelpLine system 157 provides access to the central access and control system 155 for purposes of providing information to the message tracking system 163. In addition, the HelpLine system 157 can create trouble tickets identifying problems within the communications system 10 which are passed by the central access and control system 155 to the operations center management system 153. The trouble tickets are then investigated and corrected by the operations center management system 153.

The customer computer interface system 167 is coupled to a plurality of user terminals indicated generally at 171.

Similarly, the interactive voice response system 169 is coupled to a plurality of user touchtone compatible telephones indicated generally at 173 in FIG. 13. The customer computer interface system 167 and the interactive voice response system 169 provide gateways into the central access and control system 155 for users to directly interact with the central access and control system 155. Using the customer computer interface system 167, the users can digitally interface with central access and control system 155 to accomplish the same functions performed by HelpLine system 157, customer service system 161 and message tracking system 163. Similarly, users using touchtone telephones 173 can interact with the central access and control system 155 through interactive voice response system 169 to migrate through various choices presented to the users to accomplish the same functions accomplished by HelpLine system 157, customer service system 161, and message tracking system 163.

For large scale integrated network functionality, interfacing with voice messaging systems introduces further complications for the network center 37. First, the accessing of records in the master database files must be performed using the numerical addresses of the users of the communications system. Secondly, the providing of an interactive voice response capability must be performed using standard telephone equipment using DTMF signaling, addressing must be numerical, voice must be the only media, identification confirmation must be spoken, and directory access/inquiry must be performed using DTMF signaling.

FIG. 13 also illustrates that information provider databases 39 are also coupled to external interface 62 either directly or through a bulk mailing list agent 171. The information provider databases 39 are accessed and updated by information providers 165 shown in FIG. 13. As will be discussed more completely herein, the information providers 165 can supply information for the information provider databases 39 that can be accessed by users of the communications system 10. This information may comprise, for example, advertising messages or other information associated with products or services provided by the information providers 165.

User Profiles and Address Translation Operation

The communications system of the present invention contains a directory with which it offers a range of addressing and directory services. A copy of the directory is stored in each of the network hubs and includes the network identification of a number of addresses associated with each user. The directory further includes the routing information and feature parameters associated with each user as well as identification confirmations which may comprise, for example, name records for spelled and spoken name confirmation and graphic or video images of each user for visual recognition.

Internally, the communications system of the present invention uses a globally unique number to route and deliver messages which will be referred to as the user ID. The communications system of the present invention supports multiple numbers and non-numeric addresses for each identified network user. This facilitates support for a single user mailbox to be coupled to multiple phone numbers, facsimile numbers, voice mail system numbers, E-mail identifiers, external network addresses and the like. The external addresses associated with each of these facilities may comprise arbitrary character strings with arbitrary internal structure. Because of the directory system used by the communications system of the present invention, external addresses need not be globally unique. The internal directory specifies what type of messages are to be routed to each destination associated with a particular user. Using its internal directory, the communications system of the present invention transparently converts between any address type including proprietary voice mail system addressing, North American Numbering Plan identifications, international telephone numbers, X.400 addressing, Internet addressing, and a wide variety of E-mail addressing schemes.

In order to process messages to and from external messaging systems using closed subscriber communities or private numbering plans, the communications system of the present invention must be able to interface with systems that require four digit addresses, ten digit addresses and other formats for both the sender and recipient addresses. For purposes of describing the unique address translation and message routing capability of the communications system of the present invention, the term "address" is the media specific address used to describe a subscriber. As discussed previously, a "user ID" is the unique global internal identifier of a particular user. A "community" is associated with a closed system or private numbering plan. All addresses must be unique within a community. "Scope" indicates the context in which the address should be used for the purpose of representing a particular user ID upon final delivery of a message. Scope enables the use of multiple addresses per user ID of the same address type. For example, an address with local scope is used when sending a message to the messaging system on which the address resides. Each user ID may have only one local scope address for each messaging facility. In comparison, an address identified as having global scope is used when interacting with other messaging systems.

As discussed previously, the media of a message, messaging features, and message subject matter are also used for routing purposes. The media field in the address table is used to performer-media message routing and filtering by indicating which address and message system is to be used for final delivery of the message. The feature field is used to perform per-feature routing and filtering, such as sending urgent messages to a call message delivery system rather than a conventional voice mail facility. Messages can also be routed and filtered based on the subject matter of the message using the message subject matter field in the address table.

FIG. 14 is an example of a use of the address translation functions performed within the directory previously described. The sender in FIG. 14 is named Arnie and Arnie supplies his home messaging system which is known as CASJ01 with a message and the telephone number of his friend, Greg. Greg is a subscriber to the communications system of the present invention and resides on a messaging system known as TXDL03. Arnie supplies Greg's telephone number as 214-555-2722 when Arnie records the message to Greg. The CASJ01 system supplies the message and Greg's telephone number to the communications system of the present invention. The contacted network hub can identify the source messaging system by using either the source or destination network address such as the ANI or DNIS codes of the incoming call from the CASJ01 messaging system. As shown in FIG. 14, the communications system of the present invention accesses the copy of the address translation stored in the inbound network hub coupled to messaging system CASJ01 using the destination address, message media, the source address, and the source messaging system to retrieve the source user ID equal to 3, the community identification equal to 0, the destination user ID equal to 1 and the destination message system identified as TXDL03. This information is transmitted with the message to the outbound network hub which is associated with the TXDL03 messaging system.

The outbound network hub accesses its copy of the address translation table using the received information and retrieves Greg's destination address equal to 214-555-2722 and the appropriate source address for Arnie equal to 408-555-4437. The outbound network hub used the entry for Arnie corresponding to a "global" scope because the destination messaging system TXDL03 was not the same as the source messaging system VMX-ONEL. The use of the scope field allows the communications system of the present invention to interconnect users on different messaging systems within the same organization using short form addresses or users on different messaging systems using full length addresses.

Just as Arnie has different Local and Global scope entries in the address translation table, multiple table entries may also be used to route on the other variables discussed previously such as media, subject matter or messaging features like privacy or urgency.

The user profile directory stored within the communications system of the present invention is updated using a variety of mechanisms. For example, the customer service system 161 within the network center 37 is used to directly update the database. In addition, bulk changes in batch mode can be made to the master database 151 during the enlistment of large new groups of subscribers by downloading user profiles from new messaging systems.

In addition, various message protocols include fields within the protocols for basic database information such as spoken and ASCII name information. When this information is provided as part of the message, it is retrieved from the message to update the user profile information within the master database 151 used by the communications system of the present invention. As shown in FIG. 13, users and messaging system administrators can also directly affect the information in the master database 151 by using the interactive voice response system 169 or the customer computer interface system 167 operating in the network center 37. These systems allow users to alter the user profiles associated with their addresses and, as such, alter the routing and filtering of messages passing within the communications system of the present invention to them.

Some messaging systems are already network-compatible and are able to directly share database information with the communications system of the present invention. Access to the database stored within a messaging system is achieved through analog and digital connection processors 52 and 54 described previously.

Compound Messaging

Communications system 10 is operable to receive, transport, and deliver compound messages comprising information in more than one media. These messages can either be delivered as compound messages (if supported by the messaging system of the recipient), be disintegrated into their respective media parts and delivered to their various terminals for particular media type, or have one or more media parts converted into an alternative media for delivery as either a compound or disintegrated message.

For example, a single message received by communications system 10 may comprise both a voice message and a facsimile transmission. The communications system 10 is operable to route the voice portion to a voice messaging system and the facsimile to a facsimile messaging system both of which are associated with the message recipient. The communications system 10 is also operable to translate messages received in one media to a media associated with the facilities of the message recipient if the message recipient does not have the appropriate facilities. For example, if a compound message is received by communications system 10 comprised of a voice message and an electronic mail transmission but the message recipient only has a voice messaging facility and a facsimile messaging facility, communications system 10 will transmit the voice portion of the compound message to the message recipient's voice messaging facility and translate the electronic mail message to a facsimile image for delivery to the message recipient's facsimile messaging facility. For large scale integrated network functionality, interfacing with voice messaging systems introduces further complications for the processing of compound messages in that the accessing of the user profile records to perform compound message separation and delivery must be performed using the short, fixed length numerical addresses of the users of the communications system. Additionally, the receiving of the destination addresses for the received message must be performed with DTMF signaling and the native protocol of the user's messaging system.

Messaging Features

The communications system of the present invention supports the sophisticated messaging features currently in use by various messaging systems such as privacy, urgency, delivery confirmation, return receipt, deferred delivery and the like. The role of the communications system of the present invention as a translator between messaging systems of disparate protocols and capabilities results in a unique problem for the communications system of the present invention. A user of a messaging system that has a great many sophisticated features may desire to send a message to a recipient who is only accessible through a messaging protocol or messaging system that does not support some or all of those features. The user sending his message using the communication system of the present invention is allowed to select whether or not failed support of that feature causes the message to be returned or to be delivered anyway. Accordingly, the communications system of the present invention implements the "if possible" feature to provide for flexibility in communication between messaging systems of disparate capability. For example, messages within the communications system 10 may be labeled as "private", "private if possible", or "non-private". Typically, "private" messages are interpreted by a destination messaging system as a message that cannot be forwarded and so, if "privacy" were not supported, the message would be returned to the sender with the appropriate error message. The "private if possible" designation on a message causes the communications system of the present invention to implement privacy if the destination messaging system supports that feature; if not, the message is delivered anyway.

Similarly, the communications system of the present invention supports "urgency". Messages can be labeled on submission as High, Normal, or Low urgency which determines the maximum amount of time for delivery of the message to achieve the urgency requested by the sender. As with "privacy", messages can be labeled "urgent if possible", so if the destination messaging system supports urgency or a prioritization of messages, the message is sent as urgent; if not, the message is delivered anyway.

The unique capability of the communications system of the present invention to access a variety of messaging media allows for greater flexibility in the handling of urgent messages. For example, a user may select in his parameter list that when a message is received as urgent, the message is to be delivered to a selected messaging facility and, in addition, a phone call is to be placed to his pager or other telephone number, for example.

The ability of the communications system of the present invention to hold a variety of access points for a particular user within a directory table allows for the splitting of messages as well. For example, an electronic mail message may also include a portion of voice data. If a recipient's electronic mail facility is unable to support voice (for example, the recipient is using a personal computer that does not have any sort of sound capability), the communications system of the present invention can route the voice portion of the message to the voice mailbox of the recipient and the text portion of the message to the electronic mail facility of the recipient or, alternatively, the voice portion of the message could be translated to text using the media translation facility of the communications system of the present invention and delivered with the E-mail message. On the other hand, if the recipient only has a voice messaging system, the text portion of the E-mail could be translated into voice and delivered with the voice message.

The communications system of the present invention also supports the messaging features of delivery confirmation and return receipt. For delivery confirmation, a message is sent to the message sender with confirmation of delivery of the message to the recipient's mailbox. For read receipt, a message is sent to the message sender with the time the message was heard or accessed by the recipient.

The communications system of the present invention also supports deferred delivery where a message is held for delivery at a later time. In this manner, the communications system of the present invention provides a reminder network for a reminder of important events, such as meetings, birthdays, etc. Due to the storage capabilities inherent in the communications system of the present invention, this feature can be supported without being supported by the recipient messaging system. For large scale integrated network functionality, interfacing with voice messaging systems introduces further complications for the providing of messaging features, such as privacy, urgency, delivery confirmation, etc. In the context of interaction with voice messaging systems, these features must be created, maintained, and accessed in the user profile records using the short, fixed length numerical addresses of the users of the communications system. Additionally, the receiving of these messaging features must be performed with DTMF signaling and the native protocol of the user's messaging system.

Mailing List Distribution

The communications system of the present invention supports mailing list distribution of messages using two methods. The first method uses the facility of a local alias, such as a group code which references a number of addresses. According to this facility, when the sender of the message accesses the group code, the message is replicated and a separate message is sent to each address referenced by the group code from the sender. The second method of sending a message to a large number of recipients is through a mailing agent such as, for example, bulk mailing list agent 171 discussed with reference to FIG. 13 previously and used in the case of mass distributions of information from the information providers databases 39. According to this method, the sender sends the message to the mailing agent with the list of intended recipients. The mailing agent is an address that acts as an alias for the sender to send the message to the message recipients.

The distinction between the two methods arises in the case of errors, returned messages, and message replies. When the alias feature is used, errors, returned messages, and message replies are forwarded to the actual sender of the message. This is useful if it is essential for the sender to know the ultimate disposition of all of the messages sent. In contrast, the mailing agent is the recipient of all error messages or receipt notifications when the mailing agent is used as the sender. One embodiment of the present invention utilizes the bulk mailing list agent 171 to distribute advertising or other information to a large number of recipients. This feature may be used, for example, to distribute content specific advertising to selected members of the user population based upon their user profile. In this particular embodiment, the sender of the message merely wants to know that the message was at least attempted to be sent to the entire class of intended recipients. In this application, the use of the bulk mailing list agent 171 is essential to the efficient distribution of these mass messages. For large scale integrated network functionality, interfacing with voice messaging systems introduces further complications for the providing of mailing list distribution, such as group codes and bulk mailing lists in that these features must be created, maintained, and accessed in the user profile records using the short, fixed length numerical addresses of the users of the communications system. Additionally, the receiving of these messaging features must be performed with DTMF signaling and the native protocol of the user system.

Message Routing

The distribution of messages to a large number of recipients is aided by the fact that the communications system of the present invention includes a message subject matter field with each message upon which the communications system can filter and route messages given the preferences of each user. The subject matter indication allows a sender of a message of the communications system of the present invention to designate the type of information within the message. Possible identifications include personal information, unsolicited advertising, commercial messages, or other such classes of messages. Using this feature, advertising information can be further subdivided using a message content type field. When a user is enrolled into the communications system, he can specify the types of messages he wishes to receive that reflect the user's particular interests or hobbies and to what messaging system those messages are to be routed. As discussed previously, users can alter the parameters of their user profiles including this information stored in the master database 151 through interactive voice response system 169 or customer computer interface system 167 contained in the network center 37.

The message subject matter information can also be used to route messages based on their content. For example, personal messages from a particular person might be routed directly to a special recipient facility whereas advertising material could be routed to a different facility. Further, messages of a certain content type or messages from certain senders may be blocked based upon user preferences.

Users of the communications system of the present invention may be encouraged to receive advertising messages by crediting an account associated with the user for each advertising message received and accessed. Accordingly, a single user may maintain several mailboxes or recipient facilities expressly for the purpose of categorizing and managing incoming messages. Messages passing through the communications system of the present invention can be routed on the basis of the message subject matter, message content type, and the source address. Any permutation of these three factors can be used to route the message to any of the recipient's various messaging systems.

For example, a user can specify that advertising material from a particular source, even though it comes in the form of a facsimile transmission, should be translated and routed to a particular E-mail address which the user has dedicated to advertising material to prevent the advertising material from cluttering up the user's other messaging facilities. Further, a user may require that any electronic mail message of a personal nature from a particular sender is to be immediately translated into a voice message and placed in a mailbox and, further, that a pager call is to be instituted to the user to alert him that the message is present in the voice mailbox.

For large scale integrated network functionality, interfacing with voice messaging systems introduces further complications for the providing of message routing services in that the message subject matter field which is used for routing and filtering must be created, maintained, and accessed in the user profile records using the short, fixed length numerical addresses of the users of the communications system. Additionally, the routing and filtering of messages must be performed on messages that have been received with DTMF signaling and the native protocol of the user's messaging system.

Message Tracking and Revocation

As described previously, the network hubs within the communications system of the present invention maintain constant contact with one another through the communication network 18 to constantly update both the master database 151 of user profile information and messaging tracking system 163 with administrative information regarding the status of each message that is present within the communications system 10.

In this manner, the network center 37 holds a record of the presence and status of every message that is being routed within the communications system 10 before the message has been delivered. To perform this function, message tracking system 163 is accessed through HelpLine system 157, customer computer interface system 167 or interactive voice response system 169 to determine the current location of a given message and if necessary, to cancel delivery and return it to the sender.

Message Submission from and Delivery to Nonsubscribers

The communications system of the present invention allows for the use of the communications system by nonsubscribers through public access facilities into the communications system 10. For example, a conventional telephone line may route nonsubscribers into interactive voice response system 169 or customer computer interface system 167 which collects information on the nonsubscribers such as their identification confirmation, the address for the message delivery features desired, and if necessary, billing information. Message submission from nonsubscribers can be billed on a per-message basis using 900 or 976 telephone numbers, credit cards, or on a collect basis to those subscribers who agree to pay the cost of a collect message.

Message delivery to nonsubscribers is also supported. In this manner, whenever a subscriber or a nonsubscriber sends a message using communications system 10 to a recipient who also a nonsubscriber to communications system 10, the message will be delivered to the recipient using whatever means are available to communications system 10 for the particular media type.

For voice messages or messages of other media which must be converted to voice to be delivered, communications system 10 will repeatedly attempt to call the recipient to deliver the message. Once the connection is made to the destination telephone number, the called party may use interactive voice response system 169 or similar interactive voice response systems within each network hub to facilitate delivery of the message. Secure messages are received by using a password to access the message. Interactive voice response system 169 asks the answering party to enter the appropriate password and will only deliver the message if the password is entered. Further options available to the answering party include redirecting the message to a messaging system or to another party in the case of misdelivery. Further, the answering party is also given the option to terminate delivery of the message if the intended recipient is not available and will not be available at any time. The sender of the message will then be notified using a message generated by the communications system that the message was undeliverable. Additionally, the answering party may also enter a time when the intended recipient of the message would like redelivery of the message. For large scale integrated network functionality, interfacing with voice messaging systems introduces further complications for the providing of interactive voice response services. For example, the providing of this service must be performed using standard telephone equipment using DTMF signaling, addressing must be numerical, voice must be the only media, identification confirmation must be spoken, and directory access/inquiry must be performed using DTMF signaling.

Disaster Recovery

The master database 151 includes, as described previously, constantly updated status information on messaging traffic within communications system 10 which is constantly updated for each subscriber. In addition, master database 151 contains configuration information for each messaging system coupled to communications system 10. In this manner, a large scale failure in a messaging system can be quickly restored by reconfiguring a new system using the configuration information within the master database 151. For example, if a disaster such as a fire were to strike a messaging system coupled to the communications system 10, a new messaging system could be loaded with all of the configuration data stored in the master database 151 to greatly speed the process of returning messaging capability to the subscribers.

In addition, the large storage capability within the communications system of the present invention can be used to provide storage of all messages directed to the failed messaging system until the new system is in place. The stored messages then can be downloaded in batch mode to the newly configured replacement system when it is brought on-line. In this manner, the communications system 10 provides redundant security to all messaging systems connected to the communications system 10 and provides for intermediate storage of messages during disaster recovery.

Secure Messaging Traffic

The communications system of the present invention utilizes Internet Privacy-Enhanced Mail (PEM) technology and the master database 151 to implement a public key cryptographic system to support the scrambling of messages for secure communications. For example, a message sent to a mailbox regularly read by several people, such as one read by a secretary and a supervisor, can be encrypted such that only one individual can decode the message using a secret key or double password. Other uses include private non-subscriber delivery whereby a message delivery can only be made to a specific non-subscriber if the person answering the call has the key to the encrypted message.

While PEM is a public standard and can be implemented in other contexts, the key management infrastructure to make a public key cryptographic work is difficult without a centralized authority. The communications system of the present invention uses master database 151 to provide an immediate advantage over a peer-to-peer networking system. For large scale integrated network functionality, interfacing with voice messaging systems introduces a further complication for the providing of secure messaging services, in that the public key which is used for encrypting and decrypting must be created, maintained, and accessed in the user profile records using the short, fixed length numerical addresses of the users of the communications system.

Identification Confirmation

A key aspect of a socialization of users of a networked messaging facility is the ability to confirm the identification of a recipient of a message. In other words, people are much more willing to leave a message or transmit information to a person when they receive confirmation from the communications system that the communications system is aware of the identity of the intended recipient and can present the sender with some information that creates a sense of security that it is the proper recipient. This information may be a still portrait or full motion video of the intended recipient in the video context, a rendition of the person's spoken or spelled name in the audio context, or a textual or graphic representation of the person's name either as text data or as an image of the person's signature. The user profiles contained in master database 151 and in each network hub include identification confirmations. It should be understood that the identification confirmations associated with the system of the present invention comprise more information than has been provided by prior directory based systems. For example, some prior systems have provided for directory confirmation as a user inputs the letters of an intended recipients name. These systems do not provide information other than the names from the directory and do not help to resolve the dilemmas presented by persons having the same name or directory entry. According to the teachings of the present invention, however, a subscriber who has the full capabilities of communications available to the subscriber may have data stored in the subscriber's user profile that includes the user's portrait or video of the subscriber. The same user may also have the ASCII spelling of the subscriber's name, a digitally encoded recording of the subscriber speaking his or her own name, and a graphic image of the subscriber's signature. In this manner, no matter the media of the sender, be it text, voice or video, the network can respond with information from the user's profile which will allow the sender to feel secure that the communications system is aware of the intended recipient and the appropriate recipient has been identified. The user profiles contained on master database 151 are continuously updated to allow for changes to identification confirmations of each user.

In addition, user profile information for non-subscribers is also accumulated by master database 151 by requesting identification confirmations and addressing information when nonsubscribers send messages on communications system 10. For example, when a nonsubscriber sends a message for another nonsubscriber or for a subscriber using interactive voice response system 169, interactive voice response system 169 will ask the sender to also transmit their identification confirmations. These identification confirmations are stored with the address of the sender as a new entry in master database 151. Accordingly, this user profile information is then available to future senders of messages to this nonsubscriber. Likewise, when a message is received by a nonsubscriber, the nonsubscriber may be asked to provide identification confirmations and other information for delivery of messages in the future. For large scale integrated network functionality, interfacing with voice messaging systems introduces a further complication for the providing of identification confirmation services because this service is usually a spoken name and must be replayed to the user via standard telephone equipment. The spoken name is a large, digitized segment of audio that must be stored and replayed to message senders in real time as messages are sent.

Extended Absence Processing

Many messaging systems allow for the extended absence notification to message senders. In essence, if a user will not be checking for messages due to being away from his office, place of business or home for an extended period, or for another reason, a notification can be provided to message senders to apprise them of that fact. This notification can be uploaded to the communications system and recorded in the user's profile in master database 151. Accordingly, instead of or in addition to identification confirmation being provided to a sender attempting to send a message to a recipient with an extended notification in place, the sender of the message will receive the extended absence notification. In this manner, before or after the message is sent, the sender of the message will be notified that the intended recipient of the message will not be checking messages for an extended period of time. The sender may then decide to send the message anyway or pursue other options to contact the intended recipient. For large scale integrated network functionality, interfacing with voice messaging systems introduces a further complication for the providing of extended absence services because this service is a spoken greeting and must be replayed to the user via standard telephone equipment. The extended absence greeting is a large, digitized segment of audio that must be stored and replayed to a sender in real time as messages are sent.

Directory, Addressing, and Routing Services

The communications system of the present invention can also provide messaging systems with directory addressing services. Messaging systems can connect to communications system 10 to utilize the directory and addressing information stored in the communications system 10 to determine how to deliver a message to another messaging system. For example, a messaging system attempting to deliver a message to another messaging system can contact communications system 10 to obtain all the necessary information required to deliver the message based upon whatever addressing information was originally entered by the sender of the message. Communications system 10 then performs the address translation function described previously to retrieve the information needed by the sending messaging system to enable it to make its own connection to the other messaging system to deliver the message. In this manner, messaging systems can access the entire database of user addressing information even if they do not use the communications system 10 to transport and deliver the message.

Billing and Accounting Operations

The billing system 159 within the network center 37 interacts with the central access and control system 155 which in turn stores and processes all of the billing events that occur on communications system 10 to create billing records associated with services performed by the communications system 10. An account is maintained for each user and the costs of services provided by communications system 10 are determined by each user's class of service. Services for delivery of messages may be billed in a similar fashion to that of conventional telephone calls using V&H coordinates with time of day discounts, day of week discounts and other selectable pricing structures.

Additional fees may be charged for other administrative services such as directory and address services, message tracking and revocation, media and protocol conversions, language translation, or the generation of message traffic reports to enable users of the communications system to monitor and account for message expenses.

The message priority system used in the communications system of the present invention and discussed previously allows for the communications system to offer different quality of service levels. For example, while some users may require virtually instantaneous message delivery, many users are willing to settle for longer message delivery times in exchange for discounted pricing structures. The message priority system used by communications system 10 allows the communications system to guarantee maximum message delivery times for the various classes of service.

As discussed previously, the communications system 10 provides an efficient gateway for information providers to provide services to advertisers to access a large number of customers. The communications system allows for mass distribution of information services or advertising materials to selected users who have expressed an interest in particular classes of information using their user profiles. In the case of information services, users may be billed based upon the quantity and quality of information requested.

As an incentive to get users to accept advertising material, the billing system 159 may credit the account associated with a user a small amount when the user accepts and reviews an advertising message. In addition, communications system 10 can interact with users after receipt of an advertising message through interactive voice response system 169, customer computer interface system 167, or directly through the external interface 62 using a real time communication protocol to input orders for these advertised goods. These orders may be optionally billed to the user's account within the communications system 10. In such a case, the billing system 159 will add the charge to the user's account and will also charge the information provider or advertiser a fee for processing the order.

Directory Services

Communications system 10 can provide directory services to both message senders, subscribers and nonsubscribers to allow them to locate a particular person to whom they might wish to send a message. As such, communications system 10 can guide a message sender through an automated directory access to the appropriate record in the database of directory information in order to locate the particular message recipient. A variety of systems may be presented to the user depending upon the particular messaging system and its interface with the message sender. For example, if the interface with the user is through a conventional analog line, directory access can be through interactive voice response system 169 using DTMF signals from the user's touchtone phone. The interactive voice response system 169 can first ask the message sender for categories of known information about the message recipient; for example, prompting the message sender to enter on the telephone whatever information is known about the message recipient such as the message recipient's: name, telephone number, city, company, the products and services offered, or other information. Each successive response by the message sender provides additional information which narrows the search through the master database 151 until finally the particular message recipient is identified. At such time, the identification confirmation for the identified message recipient is presented to the message sender to confirm proper message recipient has been identified.

For more complex interfaces with message senders, the automated directory can be accessed using customer computer interface system 167. In this environment, the customer computer interface system 167 can present the message sender with an automated telephone directory in graphical form with entries based on geography, company names or the products and services offered by the message recipient. In this scenario, the location of the message recipient can result in the presentation of the identification confirmation for the identified recipient as well as information identifying the messaging facilities available for the identified recipient. In this manner, the message sender can select the media of delivery of the message, if supported, as determined by the user profile information of the message recipient.

For large scale integrated network functionality, interfacing with voice messaging systems introduces further complications for the providing of directory and addressing operations services in that the address which is used for delivery and routing must be created, maintained, and accessed in the user profile records. Additionally, textual search criteria must be entered using a ten-digit numeric keypad. Further, the providing of an interactive voice response capability must be performed using standard telephone equipment using DTMF signaling, addressing must be numerical, voice or spoken, spelled text must be the only media, identification confirmation must be spoken, and directory access/inquiry must be performed using DTMF signaling.

Language Translation

According to a further aspect of the present invention, the communications system 10 is operable to translate messages between different languages to accommodate messaging between users, both subscriber and non-subscriber. An entry in each user profile indicates the user's language of choice. This indication is used by the communications system to determine the language used by the user as a sender of a message and the preferred language for receipt of messages. The language of choice indications of the sender and the recipient are used by the communications system to select the appropriate translator to use on the message. Regardless of the media of the incoming message, be it a compound message or otherwise, communications system 10 translates all parts of the message into a textual format to allow for the automated translation of the text message to take place. The translated message may then be converted into the media supported by the messaging system of the message sender.

SUMMARY

In summary, an integrated communications system is provided that allows for the addressing, transport, and management of multi-media messages between various messaging facilities with disparate capabilities, media and protocols. The network provides the capability to route messages to users of the network facilities based on any address that is known to a sender. Further, the communications system of the present invention provides translation services such that messages in one media can be delivered to a recipient in another media. The provision of a universal constantly-updated user-profile database containing information about each user provides the ability to support many user specific capabilities to be invoked for various users at various times including messaging system choice; messaging features desired; preferred protocol, media, and language; service messaging; information services protocol desired; advertising content screening; and identification confirmation. Non-subscriber sending and receiving of messages is also supported. Operational capabilities include disaster recover, billing, secure messaging, bulletin boards, and message tracking and revocation.

Although the present invention has been described in detail, it should be understood that various changes, alterations, and modifications may be made to the systems and methods described herein without departing from the spirit and scope of the present invention which is solely defined by the appended claims.

What is claimed is:

1. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system; and the network center comprises a message tracking system operable to store status information associated with messages being processed by the system, the message tracking system operable to report the status of messages being processed by the system and further operable to stop the delivery of messages at the request of the sender of the message.

2. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system;

the network center comprises a central access and control system operable to manage the interaction of the systems within the network center;

the network center comprises an interface system operable to allow users of the communications system to access the central access and control system to interact with the system; and the interface system comprises a customer computer interface system operable to allow a particular user of the communications system operating a computer terminal in communication with the customer computer interface system to alter user profile information associated with the particular user.

3. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system;

the network center comprises a central access and control system operable to manage the interaction of the systems within the network center; and the network center comprises an interactive voice response system operable to allow a particular user of the communications system to access the central access and control system to interact with the system using a telephone to alter user profile information associated with the particular user.

4. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system;

the network center comprises a message tracking system operable to store status information associated with messages being processed by the system, the message tracking system operable to report the status of a message being processed by the system and further operable to stop the delivery of the message at the request of the sender of the message;

a central access and control system operable to manage the interaction of the systems within the network center; and a customer computer interface system operable to allow users of the communications system operating computer terminals to access the central access and control system to interact with the system, the customer computer interface system operable to allow a particular user of the communications system operating a computer terminal in communication with the customer computer interface system to receive reports on the status of messages being processed by the system and to stop the delivery of messages sent by the particular user and not yet delivered by the system.

5. A communications system, comprising:

a network system operable to be connected to external voice messaging systems, interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system, the network center comprises a message tracking system operable to store status information associated with messages being processed by the system, the message tracking system operable to report the status of a message being processed by the system and further operable to stop the delivery of the message at the request of the sender of the message;

a central access and control system operable to manage the interaction of the systems within the network center and the interaction of the network center with the network system; and an interactive voice response system operable to allow users of the communications system to access the central access and control system to interact with the system using telephones, the interactive voice response system operable to allow a particular user of the communications system using a telephone in communication with the interactive voice response system to receive reports on the status of messages being processed by the system and to stop the delivery of messages sent by the particular user and not yet delivered by the system.

6. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system;

the network center comprises a billing system operable to store and accumulate accounts associated with users of the system and to report the status of the accounts;

a central access and control system operable to manage the interaction of the systems within the network center; and an interactive voice response system operable to allow users of the communications system to access the billing system through the central access and control system to interact with the billing system using telephones, the interactive voice response system operable to allow a particular user of the communications system using a telephone in communication with the interactive voice response system to receive reports on the status of the account associated with the particular user.

7. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

a network center coupled to the network system through an internal data communication path, the network center containing network support systems for the administration, tracking and operation of the communications system, the network center comprises a billing system operable to store and accumulate accounts associated with users of the communications system and to report the status of the accounts;

a central access and control system operable to manage the interaction of the systems within the network center and the interaction of the network center with the network system; and a customer computer interface system operable to allow users of the communications system operating computer terminals to access the central access and control system to interact with the system, the customer computer interface system operable to allow a particular user of the communications system operating a computer terminal in communication with the customer computer interface system to receive reports on the status of the account associated with the particular user.

8. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

the network system comprises a network hub system having a plurality of network hubs interconnected by internal data communications paths and where each of the external voice messaging systems is coupled to one of the network hubs; and each of the network hubs comprises a network processor operable to communicate to other network hubs through the internal data communication paths and where the network processor is operable to receive updated information regarding users of the system and updated information regarding status of messages being processed by the system and is operable to update a database within the network hub system to reflect the updated information received from other network hub systems.

9. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

the network system comprises a network hub system having a plurality of network hubs interconnected by internal data communications paths and where each of the external voice messaging systems is coupled to one of the network hubs;

each network hub comprises a message system database operable to store routing information used to route messages through the system;

an inbound message queue operable to store message records associated with messages received by a particular network hub;

an outbound message queue operable to store message records associated with messages to be transmitted from a particular network hub to another network hub or to an external messaging system; and a message router operable to access the message system database and the inbound message queue in order to construct the message records placed in the outbound message queue.

10. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communications protocols;

database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;

the network system comprises a network hub system having a plurality of network hubs interconnected by internal data communications paths and where each of the external voice messaging systems is coupled to one of the network hubs;

a network center coupled to the network system through an internal data communication path, the network center containing network support systems for the administration, tracking and operation of the communications system and wherein each network hub comprises:

a message system database operable to store routing information used to route messages through the system;

an inbound administrative message queue operable to store message records associated with administrative messages received by a particular hub from another hub, from the network center system, or from an external messaging system;

an outbound administrative message queue operable to store message records associated with administrative messages to be transmitted from a particular hub to another hub, to the network center, or to an external messaging system; and an administrative event manager operable to access the message system database and the inbound administrative message queue in order to construct the message records placed in the outbound administrative message queue.

11. The communications system of claim 10 where each network hub further comprises a connection manager operable to read the message records in the outbound administrative message queue, to determine the connections required to service the outbound administrative message queue message records, and to construct a connection queue comprising connection records ordering the required connections according to the priority of the administrative messages associated with the connections.

12. The communications system of claim 10 where the network center comprises a master database comprising directory information for users of the system and where each network hub comprises:

a data replicator operable to communicate with the master database and to receive database changes in order to update databases of user directory information and message system information stored within the network hub.

13. The communications system of claim 10 where each network hub comprises a management processor operable to allow the network hub to interact with the network center and to process requests from the network center for status information and for information associated with external messaging systems connected to the network hub.

14. The communications system of claim 13 where each network hub comprises an alarms database comprising a list of records specifying past events in the operation of the network hub and where the management processor is operable to manage the alarms database.

15. A communications system, comprising:
a network system operable to be connected to external voice messaging systems;
interface systems resident in the network system and operable to be coupled to the external voice messaging systems, the network system operable to receive communications traffic through the interface systems from the external voice messaging systems, at least two of the external voice messaging systems communicating with the network system using disparate communications protocols;
database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users;
the network system comprises a network hub system having a plurality of network hubs interconnected by internal data communications paths and where each of the external voice messaging systems is coupled to one of the network hubs; and
each network hub comprises a media translator comprising a plurality of transformation and translation modules, the media translator operable to sequentially use selected ones of the transformation and translation modules to selectively change messages processed by the network hub.

16. The communications system of claim 15 where the media translator is operable to selectively translate the media of a message, transform the protocol of a message and translate the language of a message.

17. A communications system, comprising:
a network system operable to be connected to external voice messaging systems;
interface systems resident in the network system and operable to be coupled to the external voice messaging systems, the network system operable to receive communications traffic through the interface systems from the external voice messaging systems, at least two of the external voice messaging systems communicating with the network system using disparate communications protocols;
database storage resident within the network system operable to store user profile information associated with users of the communications system connected through at least two of the external voice messaging systems, the user profile information comprising routing information for particular users of the communications system specifying the routing of messages according to the contents of the messages and the external messaging systems available to the particular users; and
the system operable to receive a message that is encrypted and deliver the message in encrypted form to provide secure message delivery.

18. A communications system, comprising:
a network system operable to be connected to external messaging systems;
interface systems resident in the network system and operable to be coupled to the external messaging systems, the network system operable to receive communications traffic through the interface systems from the external messaging systems;
database storage resident within the network system operable to store directory information associated with users of the external messaging systems and the communications system, the directory information comprising user profiles including advertising delivery information of users of the communications system; and
information provider databases coupled to the network system and operable to store advertising messages for distribution to selected users of the communications system based on advertising delivery information within user profiles of the selected users stored in the database storage and information associated with information services available to users of the communications system.

19. The communications system of claim 18 and further comprising
a network center coupled to the network system through an internal data communication path, the network center containing network support systems for the administration, tracking and operation of the communications system.

20. The communications system of claim 19 wherein the network center further comprises:
a central access and control system operable to manage the interaction of the systems within the network center and the interaction of the network operations system with the network hubs; and
an interface system operable to allow users to access the central access and control system to interact with the system, the interface system operable to allow a particular user in communication with the interface system to alter user profile information associated with the particular user to select types of advertising messages to be received by the particular user.

21. The communications system of claim 20 where the interface system comprises a customer computer interface system operable to allow users operating computer terminals to access the central access and control system to interact with the system.

22. The communications of claim 20 where the interface system comprises an interactive voice response system operable to allow users to access the central access and control system using telephones.

23. The communications of claim 19 where the network center further comprises:
an central access and control system operable to manage the interaction of the systems within the network center and the interaction of the network operations system with the network hubs; and
an interface system operable to allow users to access the central access and control system to interact with the system, the interface system operable to allow a particular user in communication with the interface system to alter user profile information associated with the particular user to select types of information services to be utilized by the particular user.

24. The communications of claim 23 where the interface system comprises a customer computer interface system operable to allow users operating computer terminals to access the central access and control system to interact with the system.

25. The communications of claim 23 where the interface system comprises an interactive voice response system operable to allow users to access the central access and control system using telephones.

26. The communications of claim 18 wherein the network system comprises a plurality of network hubs interconnected by internal data communications paths and where each of the external messaging systems is coupled to one of the network hubs.

27. A communications system, comprising:

a network system operable to be connected to external voice messaging systems;

interface systems resident in the network system and operable to be coupled to the external voice messaging systems, the network system operable to receive communications traffic through the interface systems from the external voice messaging systems, at least two of the external voice messaging systems communicating with the network system using disparate communication protocol; and database storage resident within the network system operable to store user profile information associated with particular users of the communications system connected through at least two of the external voice messaging systems, the user profile information comprising delivery preference information associated with the particular users, some messages routed to the particular users of the communications system comprising advertising messages identifiable by subject matter information and where a particular user of the communications system may elect to receive particular advertising messages by electing to receive messages identified by selected subject matter information, the user profile of the particular user reflecting the particular user's preferences with respect to the advertising messages.

28. The communications system of claim 27 and further comprising:

a network center coupled to the network system through an internal data communication path, the network center containing network support systems for the administration, tracking and operation of the communications system.

29. The communications system of claim 28 where an account is maintained for each user of the system within the network center and where the account of a particular user of the communications system is credited a predetermined amount for each advertising message delivered to the particular user.

30. The communications system of claim 27 where the delivery preference information comprises information specified by a particular user of the communications system as to the media in which at least some messages are to be delivered to the particular user.

31. The communications system of claim 27 where at least some of the messages processed by the communications system contain information identifying the subject matter of the messages and where the delivery preference information associated with particular users of the communications system specifies whether delivery is allowed, and where delivery is allowed the delivery preference information specifying a desired delivery location of certain specified classes of message content.

32. The communications system of claim 27 where the delivery preference information comprises information specified by a particular user of the communications system directing the system on the mode of delivery desired by the particular user if a messaging feature is not available on a destination external messaging facility.

33. The communications system of claim 18 where the directory information further comprises the messaging features that are available in each external messaging system.

34. A communications system, comprising:

a network system operable to be connected to external messaging systems;

interface systems resident in the network system and operable to be coupled to the external messaging systems, the network system operable to receive communications traffic through the interface systems from .the external messaging systems;

database storage resident within the network system operable to store directory information associated with users of the external messaging systems and the communications system, the directory information comprising user records for locating users of the communications system; and an interface system associated with the network system and operable to interact with a nonsubscriber to obtain a message nonsubscriber identification and delivery information from the nonsubscriber, the network system then operable to route the message received from the nonsubscriber within the communications system as necessary to deliver the message to an intended recipient.

35. The communications system of claim 34 and further comprising a network center coupled to the network system through an internal data communication path, the network center containing network support systems for the administration, tracking and operation of the communications system, the interface system resident in the network center.

36. The communications system of claim 34 where the interface system comprises a customer computer interface system operable to allow users operating computer terminals to access and interact with the system.

37. The communications system of claim 34 where the interface system comprises an interactive voice response system operable to allow users to access the system using telephones.

38. A communications system, comprising:

a network system operable to be connected to external messaging systems;

interface systems resident in the network system and operable to be coupled to the external messaging systems, the network system operable to receive communications traffic through the interface systems from the external messaging systems;

database storage resident within the network system operable to store directory information associated with users of the external messaging systems and the communications system, the directory information comprising a user record for each user comprising a unique internal identifier, at least one external address associated with the user, and routing information for messaging systems available to the user;

the network system operable to receive messages from external messaging systems with an external address of an intended recipient having a user record, the network system further operable to use the external address to access the user record of the intended recipient to retrieve the internal identifier of the intended recipient and the routing information for the messaging facility associated with the intended recipient appropriate for the message to be delivered; and the network system operable to access subject matter delivery preference information associated with the intended recipient of a message and to retrieve routing information associated with a messaging facility of the intended recipient appropriate for the subject matter of the message to be delivered.

39. A communications system, comprising:

a plurality of network hubs interconnected by internal data communication paths;

interface systems resident in the network hubs and operable to be coupled to external messaging systems and the internal data communication paths, the network hubs operable to receive communications traffic through the interface systems from the external messaging systems and the internal data communication paths; and a database storage resident within at least one of the network hubs operable to store directory information associated with users of the external messaging systems and the communications system; and a message system database, within each particular network hub operable to store configuration information detailing the configuration of each external messaging system connected to the particular network hub such that the messaging system database may be used to reconfigure an external messaging system should the external messaging system be damaged or a replacement external messaging system should the external messaging system be destroyed.

40. The communications system of claim 39 where each network hub comprises an emergency message storage system operable to temporarily store messages intended for users of a damaged or destroyed external messaging system such that the temporarily stored messages can be delivered to the users of the damaged or destroyed external messaging system after a damaged external messaging system is brought back into operation or a destroyed external messaging system is replaced.

41. A communications system, comprising:

a network system operable to be connected to external messaging systems;

interface systems resident in the network system and operable to be coupled to the external messaging systems, the network system operable to receive communications traffic through the interface systems from the external messaging systems;

database storage resident within the network system operable to store directory information associated with users of the external messaging systems and the communications system; and a mailing list distribution system operable to accept a message and deliver the message to a plurality of destinations, where the mailing list distribution system is recognized by the communications system as the sender of the message to the plurality of destinations such that the mailing list distribution system receives all replies and error messages resulting from the delivery of the message to the plurality of destinations.

42. A communications system, comprising:

a plurality of network hubs interconnected by internal data communication paths;

interface systems resident in the network hubs and operable to be coupled to external messaging systems and the internal data communication paths, the network hubs operable to receive communications traffic through the interface systems from the external messaging systems and the internal data communication paths;

a network center coupled to at least one of the network hubs through an internal data communication path, the network center containing network support systems for the administration, tracking and operation of the communications system;

database storage resident within at least one of the network hubs operable to store directory information associated with users of the external messaging systems and the communications system;

a message tracking system resident in the network center and operable to store status information associated with messages being processed by the communications system, the message tracking system operable to report the status of a message being processed by the system and further operable to stop the delivery of the message at the request of the sender of the message;

an interface system operable to allow users to access the message tracking system, the interface system operable to allow a particular user to receive reports on the status of messages being processed by the communications system and to stop the delivery of messages sent by the particular user and not yet delivered by the communications system; and the interface system comprises a customer computer interface system operable to allow users operating computer terminals to access and interact with the message tracking system.

43. A communications system, comprising:

a plurality of network hubs interconnected by internal data communication paths;

interface systems resident in the network hubs and operable to be coupled to external messaging systems and the internal data communication paths, the network hubs operable to receive communications traffic through the interface systems from the external messaging systems and the internal data communication paths;

a network center coupled to at least one of the network hubs through an internal data communication path, the network center containing network support systems for the administration, tracking and operation of the communications system;

database storage resident within at least one of the network hubs operable to store directory information associated with users of the external messaging systems and the communications system;

a message tracking system resident in the network center and operable to store status information associated with messages being processed by the communications system, the message tracking system operable to report the status of a message being processed by the system and further operable to stop the delivery of the message at the request of the sender of the message;

an interface system operable to allow users to access the message tracking system, the interface system operable to allow a particular user to receive reports on the status of messages being processed by the communications system and to stop the delivery of messages sent by the particular user and not yet delivered by the communications system; and the interface system comprises an interactive voice response system operable to allow users to access and interact with the message tracking system using telephones.

44. A communications system, comprising:

a plurality of network hubs interconnected by internal data communication paths;

interface systems resident in the network hubs and operable to be coupled to external messaging systems and the internal data communication paths, the network hubs operable to receive communications traffic through the interface systems from the external messaging systems and the internal data communication paths;

a network center coupled to at least one of the network hubs through an internal data communication path, the network center containing network support systems for the administration, tracking and operation of the communications system;

database storage resident within at least one of the network hubs operable to store directory information associated with users of the external messaging systems and the communications system;

a message tracking system resident in the network center and operable to store status information associated with messages being processed by the communications system, the message tracking system operable to report the status of a message being processed by the system and further operable to stop the delivery of the message at the request of the sender of the message; and where an account is maintained for each user of the communications system within the network center and where the account of the user accessing the message tracking system is charged an mount dependent on the service requested of the message tracking system.

45. A communications system, comprising:

a plurality of network hubs interconnected by internal data communication paths;

interface systems resident in the network hubs and operable to be coupled to external messaging systems and the internal data communication paths, the network hubs operable to receive communications traffic through the interface systems from the external messaging systems and the internal data communication paths;

a network center coupled to at least one of the network hubs through an internal data communication path, the network center containing network support systems for the administration, tracking and operation of the communications system; and database storage resident within at least one of the network hubs operable to store directory information associated with users of the external messaging systems and the communications system, the directory information comprising user records for locating users of the communications system and comprising at least one external address and a unique internal identifier for each user of the system; and an interface system resident in the network center operable to interact with nonsubscriber users of the communications system to locate particular users of the communications system using information supplied by the nonsubscriber users in connection with using the database storage resident within the at least one of the network hub.

46. The communications system of claim 45 where the interface systems are operable to perform searches of the directory information responsive to parameters supplied by the nonsubscriber users of the communications system and to report the results of the searches to the nonsubscriber users by presenting the nonsubscriber users with identification confirmations from the users of the communications system identified by the search.

47. The communications system of claim 45 where the interface systems may be directly accessed by nonsubscriber users of the communications system in order to identify users of the communications system and to send messages to the identified users.

48. The communications system of claim 45 where the interface systems comprise a customer computer interface system operable to allow users operating computer terminals to access and interact with the communications system.

49. The communications system of claim 45 where the interface systems comprise an interactive voice response system operable to allow users to access and interact with communications system using telephones.

50. A communications system, comprising:

a plurality of network hubs interconnected by internal data communication paths;

interface systems resident in the network hubs and operable to be coupled to external messaging facilities and the internal data communication paths, the network hubs operable to receive communications traffic through the interface systems from the external messaging facilities and the internal data communication paths;

a network center coupled to at least one of the network hubs through an internal data communication path, the network center containing network support systems for the administration, tracking and operation of the communications system; and database storage resident within at least one of the network hubs operable to store directory information associated with users of the external messaging facilities and the communications system, the directory information comprising a user record for each user comprising information associated with at least one delivery feature, the user record further comprising information indicating the actions to be taken by the system in the event that the delivery feature is not supported by a messaging system associated with an intended message recipient.

51. The communications system of claim 50 where the delivery feature comprises the ability to designate a selected message as urgent.

52. The communications system of claim 51 where the information indicating the actions to be taken may be configured to cause the message to be returned if the urgency feature is not supported.

53. The communications system of claim 51 where the information indicating the actions to be taken may be configured to cause the message to be delivered even if the urgency feature is not supported.

54. The communications system of claim 50 where the delivery feature comprises the ability to designate a selected message as private.

55. The communications system of claim 54 where the information indicating the actions to be taken may be configured to cause the message to be returned if the privacy feature is not supported.

56. The communications system of claim 54 where the information indicating the actions to be taken may be configured to cause the message to be delivered even if the privacy feature is not supported.

* * * * *